(12) United States Patent
Alexander

(10) Patent No.: US 11,773,680 B1
(45) Date of Patent: Oct. 3, 2023

(54) MECHANICAL PACKER SYSTEMS FOR CONTROLLING FLUID FLOW

(71) Applicant: Alexander Innovations, LLC, Chapel Hill, NC (US)

(72) Inventor: W. Joseph Alexander, Chapel Hill, NC (US)

(73) Assignee: Alexander Innovations, LLC, Chapel Hill, NC (US)

(*) Notice: Subject to any disclaimer, the term of this patent is extended or adjusted under 35 U.S.C. 154(b) by 0 days.

(21) Appl. No.: 17/537,696

(22) Filed: Nov. 30, 2021

Related U.S. Application Data

(60) Provisional application No. 63/119,285, filed on Nov. 30, 2020.

(51) Int. Cl.
*E21B 33/12* (2006.01)
*E21B 43/12* (2006.01)

(52) U.S. Cl.
CPC .............. *E21B 33/12* (2013.01); *E21B 43/12* (2013.01)

(58) Field of Classification Search
CPC ................................. E21B 33/12; E21B 43/12
See application file for complete search history.

(56) References Cited

U.S. PATENT DOCUMENTS

| | | | | |
|---|---|---|---|---|
| 2,849,070 A | * | 8/1958 | Maly | E21B 33/12 165/178 |
| 3,038,542 A | * | 6/1962 | Loomis | E21B 33/1216 166/187 |
| 3,647,230 A | * | 3/1972 | Smedley | F16J 15/3228 277/335 |
| 3,734,179 A | * | 5/1973 | Smedley | E21B 33/12 166/106 |
| 9,937,537 B2 | | 4/2018 | Alexander et al. | |
| 10,556,260 B2 | | 2/2020 | Alexander et al. | |

* cited by examiner

*Primary Examiner* — Steven A MacDonald
(74) *Attorney, Agent, or Firm* — NK Patent Law

(57) ABSTRACT

The present disclosure relates to mechanical packer systems. More particularly, the present disclosure relates to devices, tools, and methods for controlling fluid flow with one or more mechanical packer assemblies. A mechanical packer system may be used in vertical, inclined, or horizontal casings, pipes, boreholes, cartridges, or similar conduits. The mechanical packer system may be applied in casings below a ground surface (e.g., groundwater contamination assessments, groundwater resource investigations, or oil and gas exploration) or used in casings above a ground surface (e.g., water or gas lines, drainage pipes, or horizontal borings in tunnels). The mechanical packers described in the present disclosure are generally considered retrievable and useful for other purposes; however, the systems could also be dedicated to a specific application and considered permanent.

20 Claims, 37 Drawing Sheets

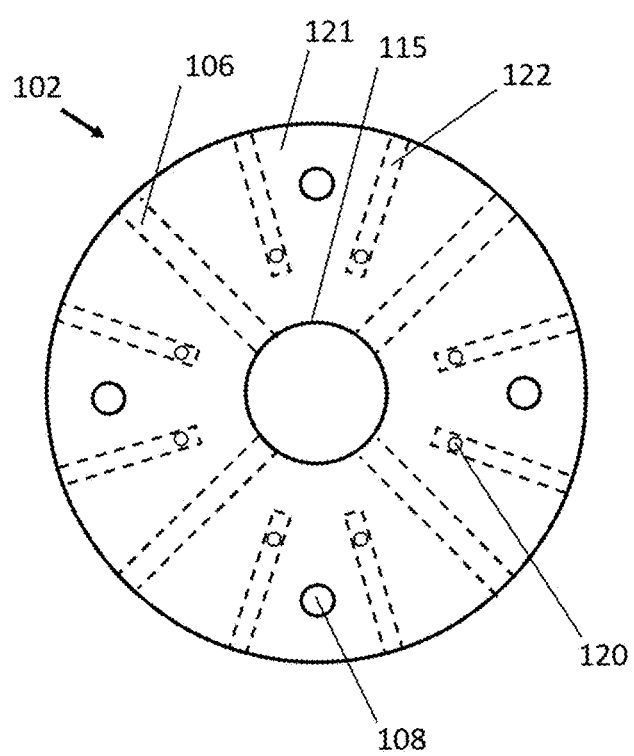
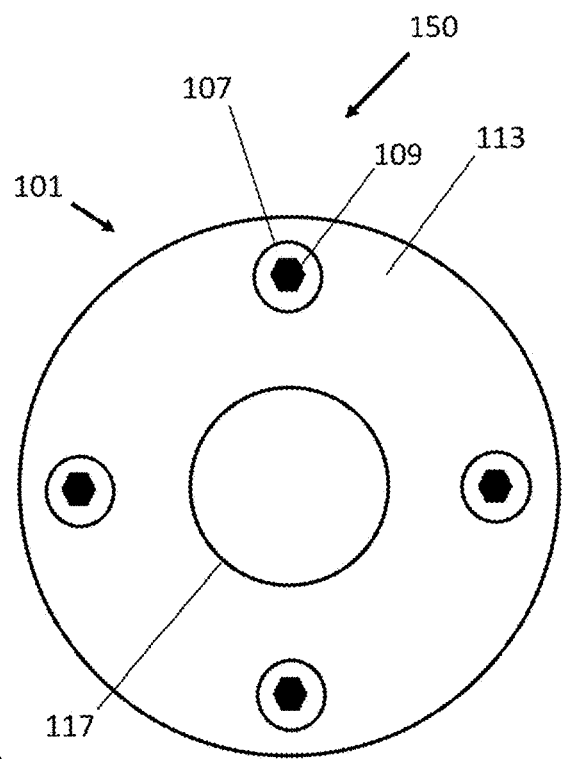
FIG. 3A
FIG. 3B

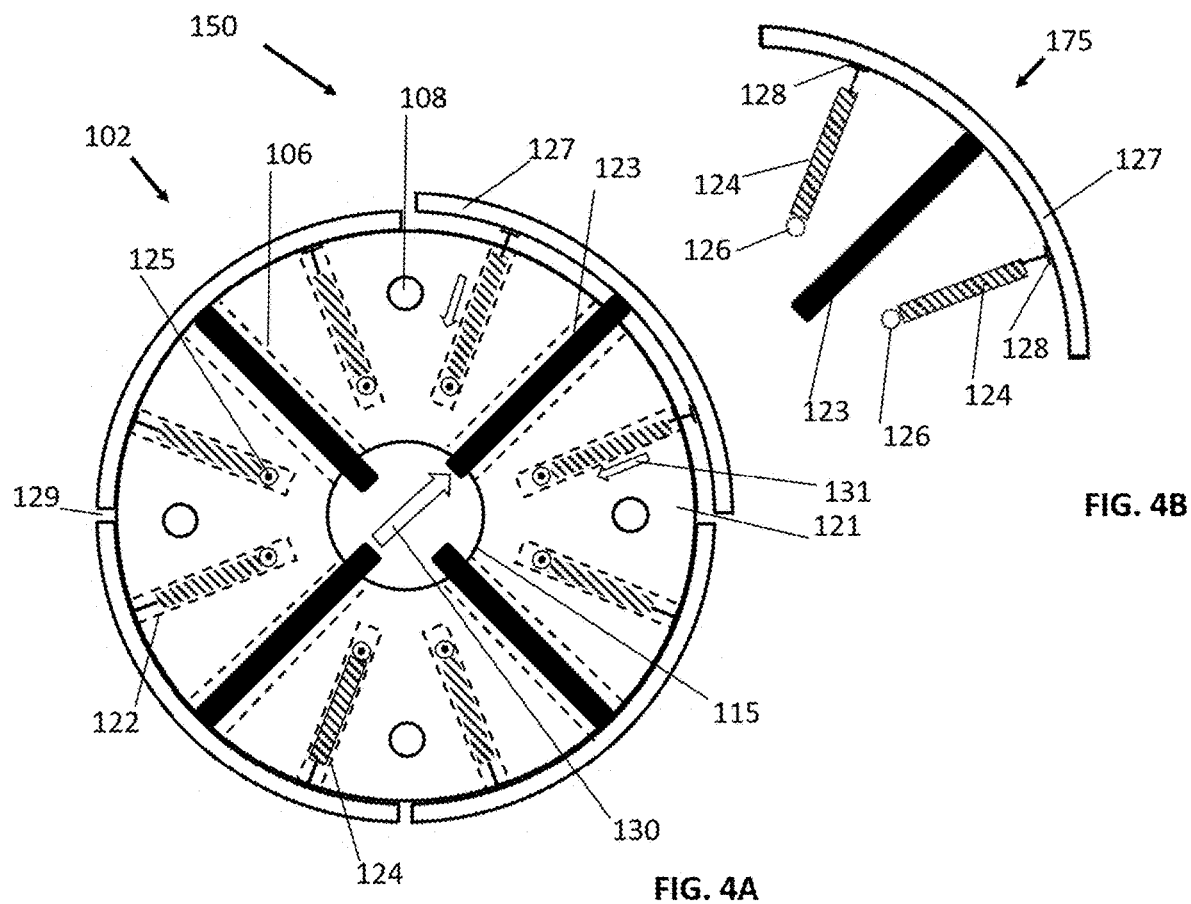

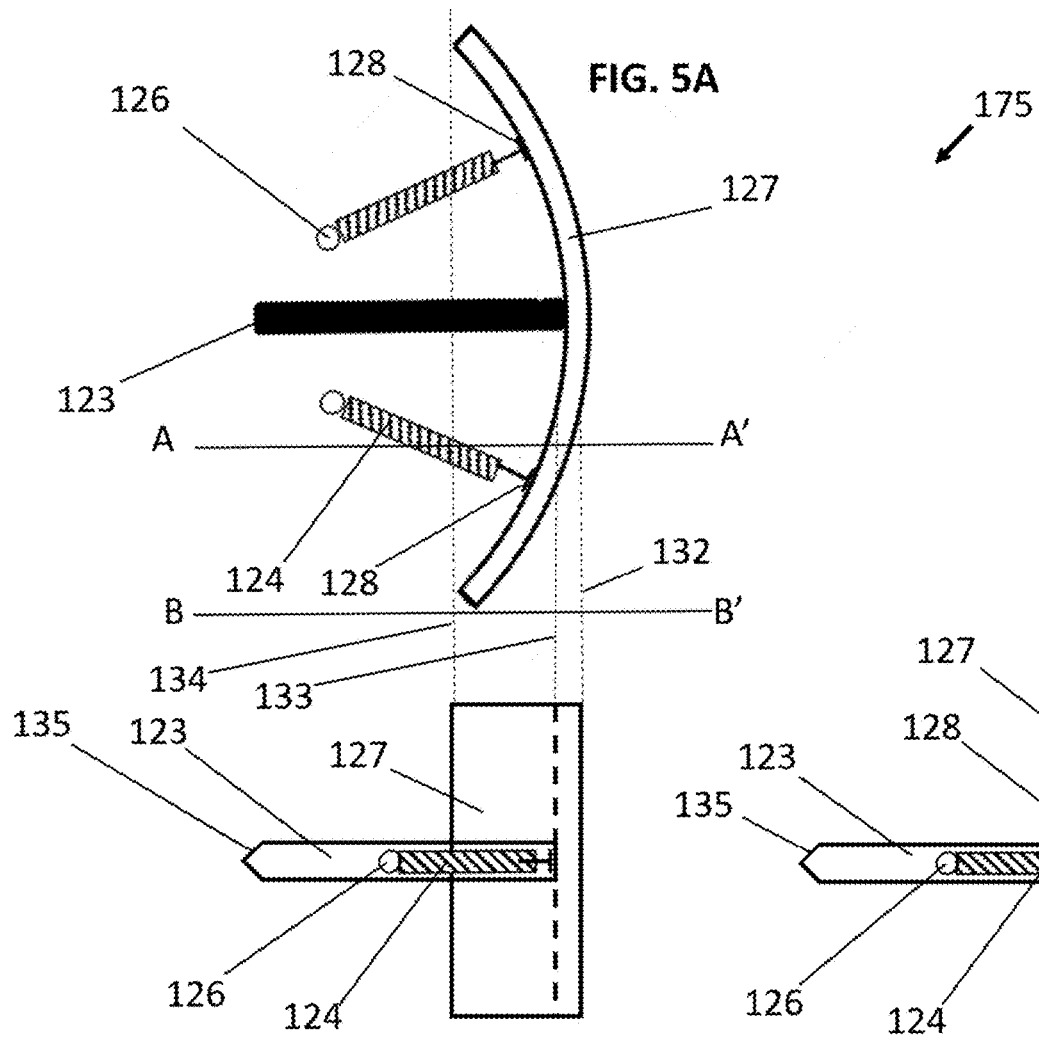

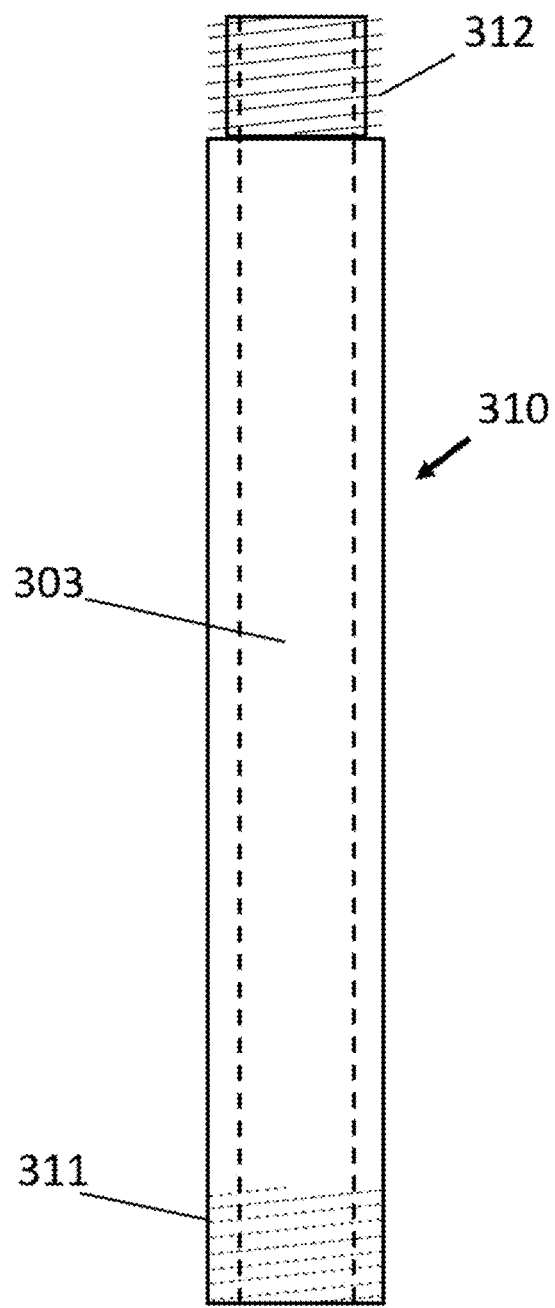 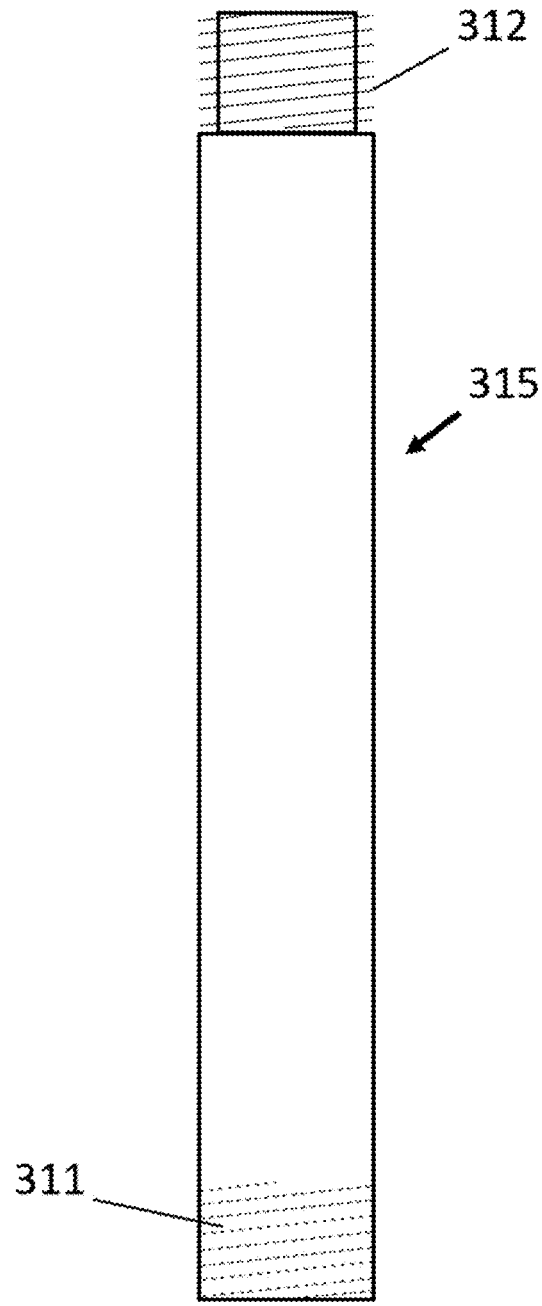
FIG. 14A  FIG. 14B

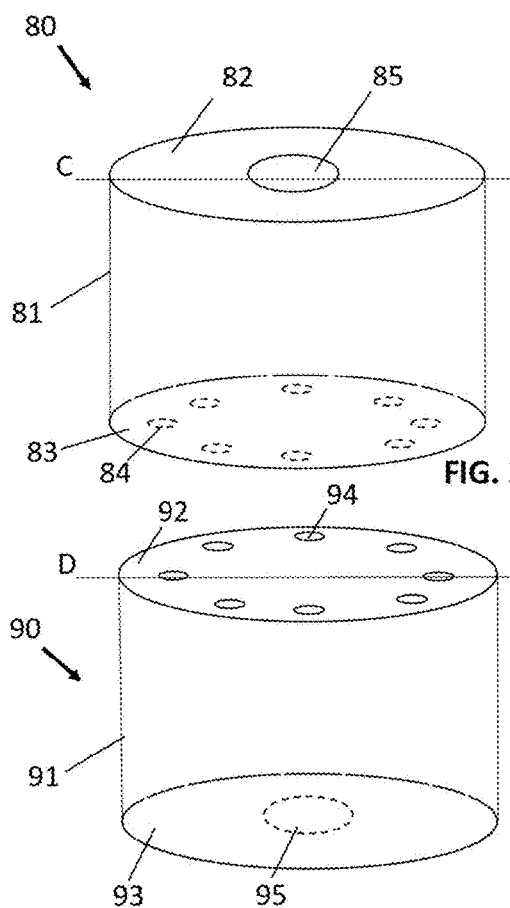
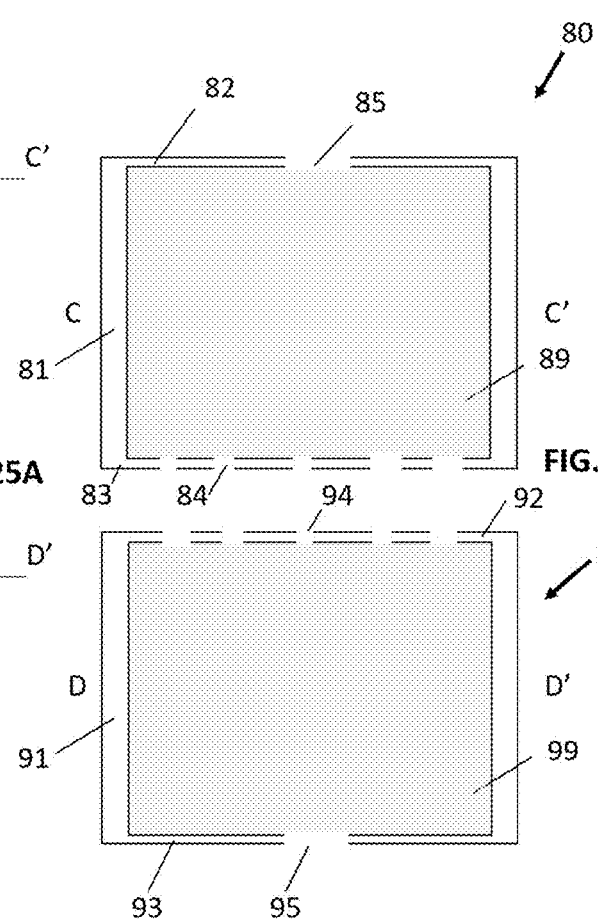
FIG. 25A
FIG. 25B
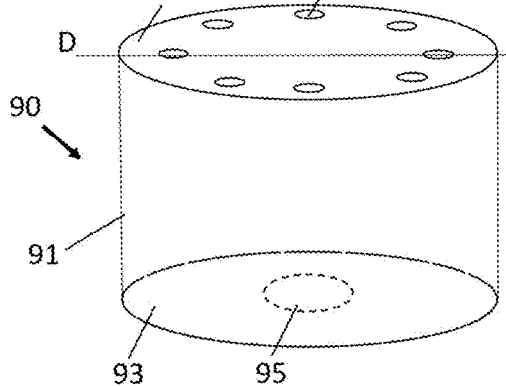
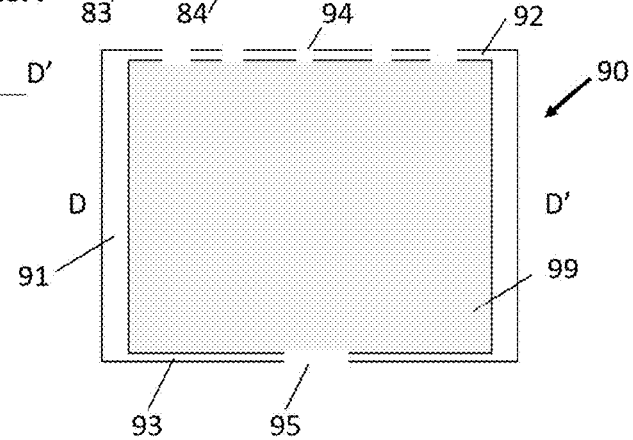
FIG. 25C
FIG. 25D

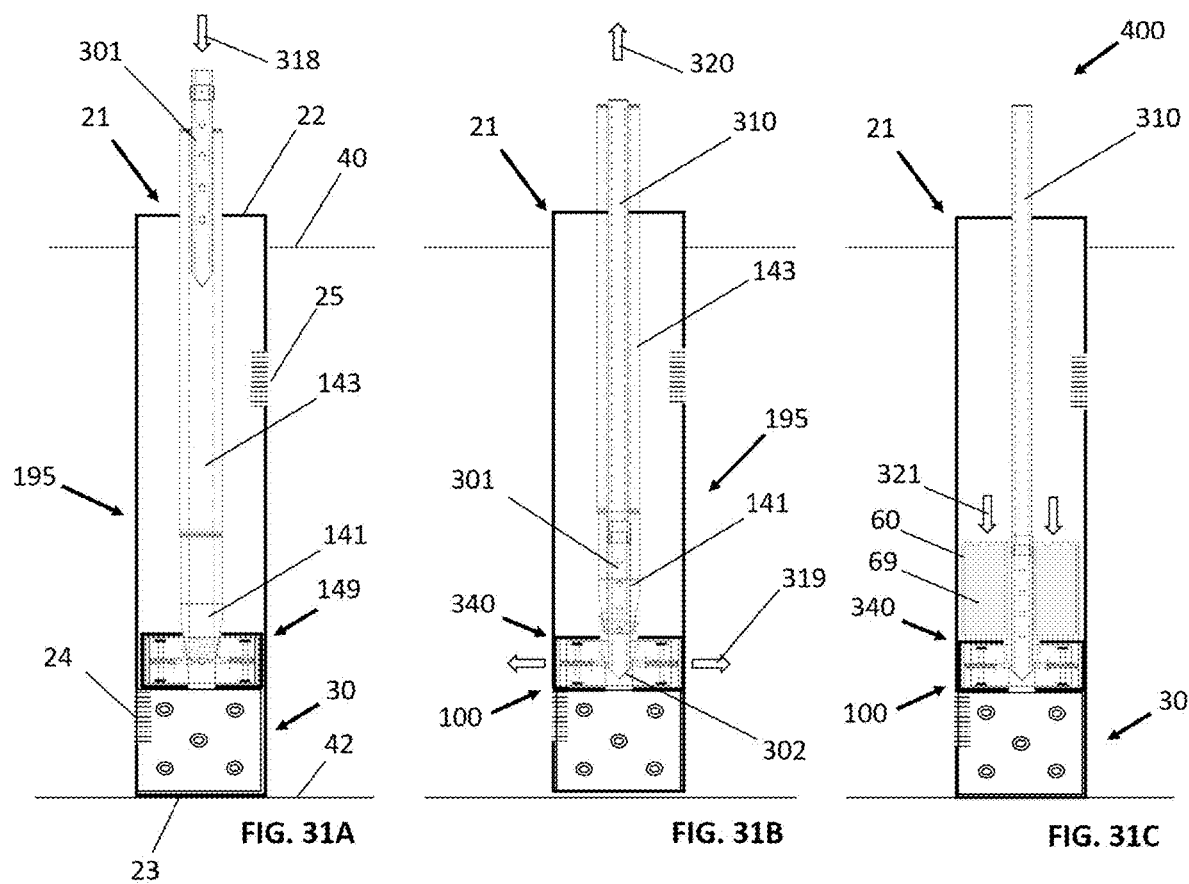

MECHANICAL PACKER SYSTEMS FOR CONTROLLING FLUID FLOW

CROSS-REFERENCE TO RELATED APPLICATIONS

This application claims priority to U.S. Provisional Patent Application No. 63/119,285 filed on Nov. 30, 2020, the entire contents of which are incorporated by referenced herein.

TECHNICAL FIELD

The present disclosure relates to mechanical packers. More particularly, the present disclosure relates to devices, tools, and methods for positioning and operating mechanical packer systems in casings for the purpose of controlling fluid flow.

BACKGROUND

Packers have a wide range of industrial applications such as in oil and gas exploration, geotechnical investigations, and environmental evaluations, where it is often necessary to seal or isolate a specific interval within casings, pipes, boreholes, cartridges, or similar conduits (commonly referred to in the present disclosure as casings). Packers generally have flexible elastomeric elements that expand radially outwardly typically by either pneumatic or mechanical forces. Pneumatic, sometimes referred to as inflatable packers, rely on pumping a fluid from an external source usually conveyed by tubing into the cavity of a flexible hollow bladder that outwardly expands to isolate and seal an interval in a casing. Conventional mechanical packers generally have plates on either side of a flexible elastomeric material that expands outwardly when the plates are compressed toward each other, usually by torqueing a threaded device or by use of clamping methods.

Inflation requirements need to be carefully followed for pneumatic packers and pressures need to be monitored and adjusted as necessary for optimal operation. Conventional compression-based mechanical packers are simple in operation; however, many are limited in application to relatively shallow depths below the ground surface.

The applicant identified a need for a multipurpose packer system that overcomes some of the limitations of pneumatic and mechanical packers while providing other advantageous features. Specifically, the applicant sought the following key features in a packer system that would be advantageous: 1) the ability for the system to maintain a substantial seal in a casing and thereby prevent the flow of fluids for a long period of time (i.e., months) without the need for monitoring and adjusting fluid pressure as typical of pneumatic packers; 2) the ability to radially extend the circumference of the packer assembly beyond that typically achieved by conventional compression-based mechanical packers thereby offering a substantial seal as well as structural support of other devices that may be resting on the packer (such as a fluid-treatment cartridge); 3) an easy-to-use-tool for positioning a first packer assembly in a casing that also accommodates a separate easy-to-use-tool for activating and deactivating not only the first packer assembly but a second packer assembly that resides on one of the tools and may be installed at a different location in the same casing; 4) the ability of a packer assembly and associated tools to be functionally integrated with other devices that may be incorporated with the packer system, such as a fluid-treatment cartridge; 5) the ability of the packer activation and deactivation tools to serve other purposes in a casing, such as a supporting a second packer assembly, measuring fluid pressure, and/or obtaining a fluid sample for a laboratory analysis of physical or chemical properties; 6) a packer system that is not depth limited as common in conventional compression-based mechanical packers; and 7) the ability to remove other devices from a casing (e.g., a fluid-treatment cartridge) while the packer assembly remains in place preventing fluid flow.

Relevant patents by the inventor (U.S. Pat. Nos. 9,937,537 B2 and 10,556,260 B2) are referenced in the present disclosure specifically with respect to a filter casing, an interconnected barrier wall, and a liquid treatment cartridge inside the filter casing. These three components are used in example applications of mechanical packer systems herein. In particular, the present disclosure provides an alternative to the use of an inflatable seal on the exterior casing of a treatment cartridge. In some cases, an inflatable seal on a fluid treatment cartridge may be used in conjunction with the alternative mechanical packer systems described herein.

The inventor's prior art describes in detail a liquid treatment cartridge (referred to generally herein as a fluid treatment cartridge for a broader scope of the inventive subject matter, or a treatment cartridge, or simply a cartridge). The prior art describes placement of a treatment cartridge in a filter casing wherein an annular space is defined between an exterior of the cartridge casing and an interior of the structural wall of the filter casing. The treatment cartridge has an inflatable seal that when in an inflated condition an annular space is filled by the inflatable seal such that the treatment cartridge is engaged with the interior of the structural wall of the filter casing. When the inflatable seal is in a deflated condition the treatment cartridge is disengaged from the interior of the structural wall of the filter casing permitting the treatment cartridge to be placed within and removed from the structural wall of the filter casing. Tubing for inflating the pneumatic seal is either outside or inside the casing of the treatment cartridge and extends to the ground surface where the tubing is connected by various fittings and valves for filling the seal (with air, water, or other fluids) and a gage for monitoring pressure within the seal.

Several embodiments of fluid treatment cartridges specifically for use with mechanical packer systems are discussed with detail in the present disclosure (without a seal on the external casing of the cartridge that could optionally added in some cases where additional sealing of an annular space may be found to be advantageous).

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

The present disclosure describes devices, tools, and methods for positioning and operating mechanical packer systems in casings for the purpose of controlling fluid flow. The mechanical packer systems described in the present disclosure may be used in vertical, inclined, or horizontal casings, pipes, boreholes, cartridges, or similar conduits (commonly referred to herein as casings). The mechanical packer systems may be applied in casings below a ground surface (e.g., controlling fluid flow in groundwater contamination assessments, groundwater resource investigations, or oil and gas exploration). The mechanical packer systems may be applied in casings above a ground surface (e.g., controlling fluid flow in water or gas lines, drainage pipes, or horizontal borings in tunnels).

In at least one embodiment, a mechanical packer assembly includes: an upper and lower plate with interior channels that form cylindrical bores that radiate from a central hole when the plates are detachably secured to each other.

In at least one example, cylindrical rods operate within some of the bores in the plates, one end of each rod is attached to a disc on the outer circumference of the plates, the other end of each rod is beveled and extends into the center hole of the plates.

In at least one example, springs operate within other bores in the plates on both sides of each rod, one end of each spring is attached to a disc on the outer circumference of the plates and the other ends of each spring are attached to the interior of the plates.

In at least one example, most of the external surfaces of the packer assembly are encased in a formed rubber material.

In at least one embodiment, a mechanical packer assembly is placed in position in a casing by a hollow core cylindrical tool which includes: a hollow core sub with threads to connect with opposing threads in the central hole of one plate of the mechanical packer assembly and one or more hollow core stems that are connected to the sub (the tool is referred to herein as a packer stem assembly).

In at least one example, the packer assembly is positioned by the packer stem assembly to a desired location inside a casing, an annular space is defined between the exterior of the packer assembly and an interior of the structural wall of the casing.

In at least one embodiment, a cylindrical tool for actuating the packer assembly consists of: a sub that is beveled on one end to interact with the beveled ends of the cylindrical rods exposed in the central hole of the packer assembly and the other end connected to one or more stems (the tool is referred to herein as a packtivator).

In at least one example, when a packtivator is inserted into the hollow core of the packer stem assembly and the beveled end of the packtivator sub contacts the beveled rods exposed in the center hole of the packer assembly, a mechanical wedge force results that extends the rods radially out from the center of the packer assembly.

In at least one example, the rods which are connected to two or more discs that surround the circumference of the packer assembly are also extended radially outward from the packer assembly.

In at least one example, as the packtivator continues to exert a mechanical wedge force on the rods, the discs which are encased in a formed rubber material fill the annular space between the exterior of the packer assembly and the interior of the structural wall of the casing.

In at least one example, the actuated packer assembly applies a uniform compressive force on the interior structural wall of the casing and the formed rubber material seals the annual space preventing fluid flow.

In at least one example, the packer assembly is deactivated when a packtivator is withdrawn from a casing, the mechanical wedge force is removed, extension springs return the disc assemblies to the plates, placing the packer assembly in an inactive state, and the packer assembly is withdrawn from the casing by the packer stem assembly.

In at least one embodiment, a fluid treatment cartridge integrated with a mechanical packer system includes: a cylindrical cartridge casing that houses media for treatment of fluids, having solid external walls, a perforated internal cylinder to fit over a packtivator, a top and bottom plate, one plate of which is perforated.

In at least one example, a fluid treatment cartridge is positioned inside a casing over a packtivator and seated adjacent to an actuated packer assembly.

In at least one example, a second packer assembly is positioned near the top of a first packtivator at the top of the fluid treatment cartridge and is activated by a second packtivator.

In at least one example, the two actuated packer assemblies control fluid to flow into the internal cylinder of the fluid treatment cartridge, through perforated holes in the walls of the internal cylinder, into the media inside the fluid treatment cartridge, and out perforated holes on either the top or bottom cover of the fluid treatment cartridge (depending on the orientation of the fluid treatment cartridge within a casing and the direction of fluid flow), thereby preventing the fluid from bypassing treatment inside the cartridge.

In addition to the broader advantages of a mechanical packer system previously discussed in the background section, there are additional advantages that are apparent when using mechanical packer systems and associated devices, tools, and methods for positioning and operating mechanical packer systems in casings for the purpose of controlling fluid flow, specifically when a fluid treatment cartridge is introduced into the casing. These advantages include, but are not limited to: 1) eliminates the risk of damaging an exposed inflatable seal external to a fluid treatment cartridge during transport or installation; 2) reduces the need for centralizers on the fluid treatment cartridge used to align the cartridge in a casing in order to help protect an exposed inflatable seal external to the cartridge; 3) allows media to be compacted on the interior of a fluid treatment cartridge without risk of damage to tubing, valves, and fittings that may be installed inside the cartridge; 4) removes a potential conduit inside the fluid treatment cartridge that could otherwise serve as a preferential flow path for a fluid to bypass sufficient treatment by contact and increased residence time with the treatment media; 5) enables testing of the hydraulic integrity of a subsurface barrier wall connected to one or more filter casings in advance of installing a fluid treatment cartridge; and 6) reduces time required to isolate and correct potential leaks.

In regard to sixth advantage, the integrity of a mechanical packer to control fluid flow can be tested in a casing in advance of installing a cartridge. Conversely, when a seal directly on the fluid treatment cartridge is not sufficiently controlling fluid flow, the heavy cartridge has to be hoisted out of the filter casing, returned to a laboratory or suitable facility, dismantled, and the treatment media removed (when the tubing, valves, and fittings are on the inside of the cartridge). Once the problem is isolated, the cartridge has to be reassembled, transported, reinstalled in the casing, and rechecked while potentially contaminated fluids have been by-passing treatment in the cartridge during the down time, in this example. Separating the treatment function from sealing function could be advantageous, particularly in environmental applications.

The mechanical packer systems described in the present disclosure are retrievable; however, the systems could also be dedicated to a specific application and considered permanent. Additional advantages of the multi-purpose mechanical packer systems are likely to recognized beyond those described in the present disclosure and applications for other purposes are expected beyond those stated herein.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

FIG. 3A and FIG. 3B are overhead views of components of a mechanical packer before assembly.

FIG. 4A and FIG. 4B are overhead views of components of a mechanical packer before assembly.

FIG. 5A is an overhead view of a disc assembly and FIG. 5B and FIG. 5C are sectional views of a disc assembly used in a mechanical packer.

FIG. 14A and FIG. 14B are cross sectional views of two embodiments of packtivator stems.

FIG. 25A is an isometric view of a third embodiment of an fluid treatment cartridge and FIG. 25B is a sectional view of the third embodiment showing a treatment media inside. FIG. 25C is an isometric view of a fourth embodiment of an fluid treatment cartridge and FIG. 25D is a sectional view of the fourth embodiment showing a treatment media inside.

FIG. 30 is a side elevation view of an example application of a mechanical packer system showing a sequence of three installation steps that could be followed in operation.

FIG. 31 is a side elevation view of an example application of a mechanical packer system representing a continuation of the three installation steps shown in FIG. 30. FIG. 31A shows a stem assembly connected to a large packer assembly and a packtivator partially inserted into a hollow core packer stem. FIG. 31B shows activation of a large packer assembly and removal of a hollow core packer stem assembly. FIG. 31C shows a seating of an fluid treatment cartridge on an activated large packer assembly resting upon a permeable spacer at the bottom of a casing.

FIG. 32 is a side elevation view of an example application of a mechanical packer system representing a continuation of the three installation steps shown in FIG. 31.

DETAILED DESCRIPTIONS

Figure 1:
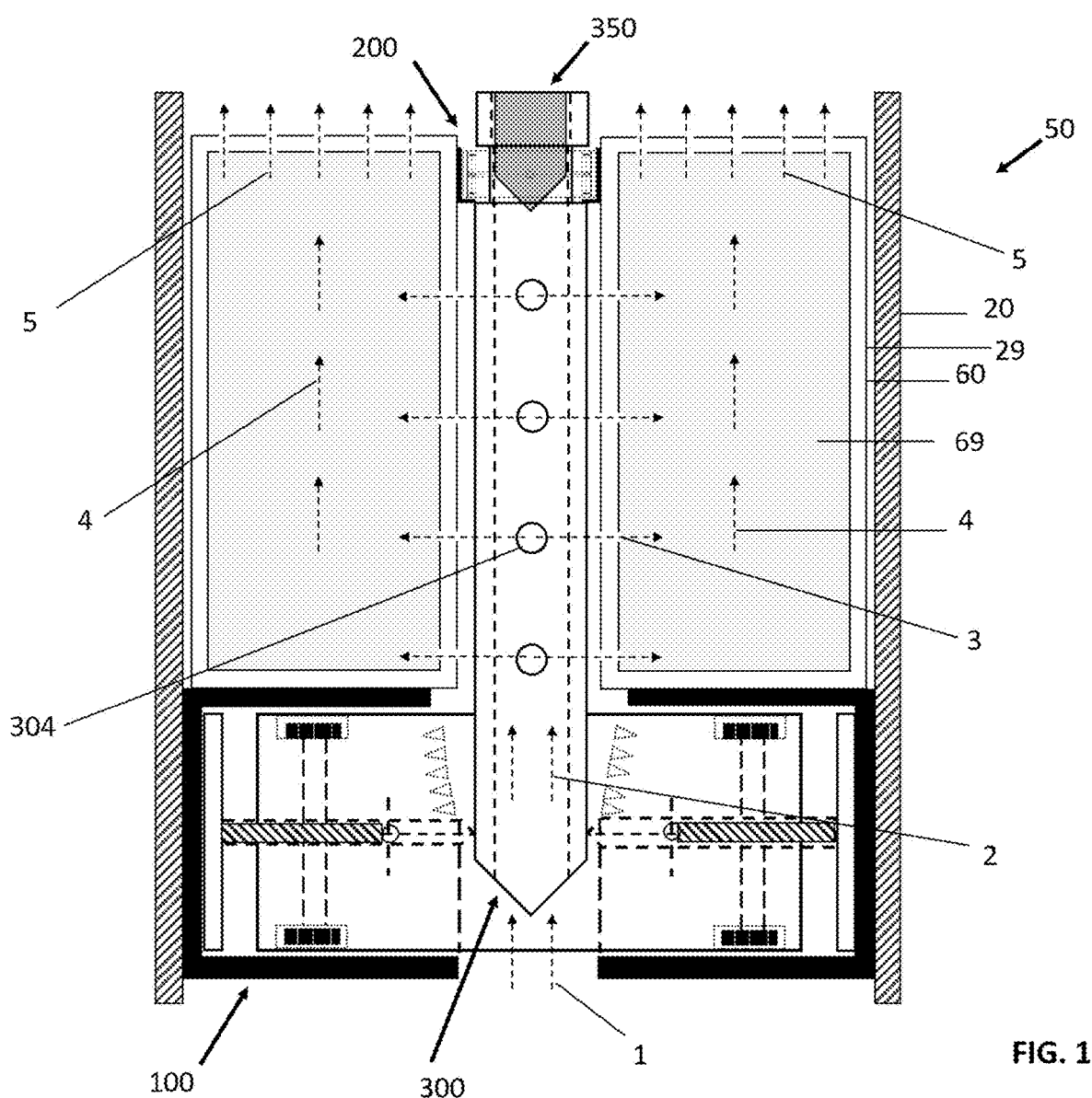
FIG. 1 is a side elevation view of an example application of a large and a small mechanical packer assembly in a casing that have been activated by cylindrically-shaped tools to control the flow of a fluid by directing the fluid through a treatment cartridge.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing. Although the drawings largely reference a vertical orientation of a casing, pipe, borehole, cartridge, or similar conduit (i.e., largely referred to the present disclosure as a casing), the inventive subject matters are not limited to a particular orientation of a casing (e.g., the devices in the present disclosure will also work in a horizontal or inclined casing).

FIG. 1 is a side elevation view of an example application 50 of a mechanical packer system consisting of a large packer assembly 100 in position at a lower elevation inside a section of a vertical cylindrical casing 20 and a small packer assembly 200 in position at an upper elevation. A cylindrically-shaped hollow core tool 300 has activated a large mechanical packer assembly 100 and a smaller solid core cylindrically-shaped tool 350 has activated a small mechanical packer assembly 200 at an upper elevation. Packer assemblies 100 and 200 in the example application 50 are combined with a fluid treatment cartridge 60 which contains a media 69 on the inside to treat a fluid.

Packer assemblies 100 and 200 shown in FIG. 1 are controlling the flow of a fluid as indicated by dashed arrows 1 through 5 referencing different points along a fluid flow path (i.e., the fluid is generally flowing from points 1 to 5 in this example, which are referred to herein as flow arrows intended to illustrate the general direction of fluid flow). Specifically, in this example 50, a contaminated fluid enters a lower elevation of a casing 20 and flows into the bottom of a large packer assembly 100 shown by parallel flow arrows 1. If the large packer assembly 100 was not present or activated, some of the contaminated fluid would be able to bypass treatment by flowing in the annular space 29 between the fluid treatment cartridge and interior walls of the casing 20. Instead, the fluid flows upward in a hollow core of a cylindrically-shaped tool 300 shown by parallel flow arrows 2 and then flows laterally out a plurality of holes 304 in a tool 300 shown by parallel flow arrows 3 into a treatment media 69 inside a fluid treatment cartridge 60. A small solid core cylindrically-shaped tool 350 that has activated a small mechanical packer assembly 200 at an upper elevation prevents fluid from bypassing treatment inside the fluid treatment cartridge 60, and instead, the fluid has been laterally dispersed as shown by parallel flow arrows 3 into a cartridge 60 for contact with a treatment media 69 and continues to flow upward as shown by parallel flow arrows 4. In this example application 50, a contaminated fluid that entered a packer assembly 100 at a lower elevation of a casing 20 shown by flow arrows 1 has undergone treatment by contact with the media 69 within a cartridge 60 before flowing out the top of a cartridge 60 shown by flow parallel arrows 5 at a higher elevation.

In the example application 50 shown in FIG. 1, and for general reference only, a larger packer assembly 100 may be on the order of 12-inches in diameter whereas a smaller packer assembly 200 may be only 2-inches in diameter. Other applications are envisioned where different configurations, geometry, and sizes of packer assemblies are used to achieve other objectives still within the scope of the inventive matters. The casing 20 shown in the example application 50 may be represented by steel, plastic, fiberglass, or other material with or without well screens or slots (not shown in FIG. 1). In other applications one or more packer assemblies may be used in an open borehole, for example, drilled vertically, horizontally, or at an inclination in rock, where no casing is required. The devices and mechanisms for construction of a larger packer assembly 100, a small packer assembly 200, a cylindrically-shaped hollow core tool 300 for activating a large mechanical packer assembly 100, and a smaller solid core cylindrically-shaped tool 350 for activating a small mechanical packer assembly 200, are described in more detail in the present disclosure, along with a description of other embodiments and methods for operation.

Figure 2A:
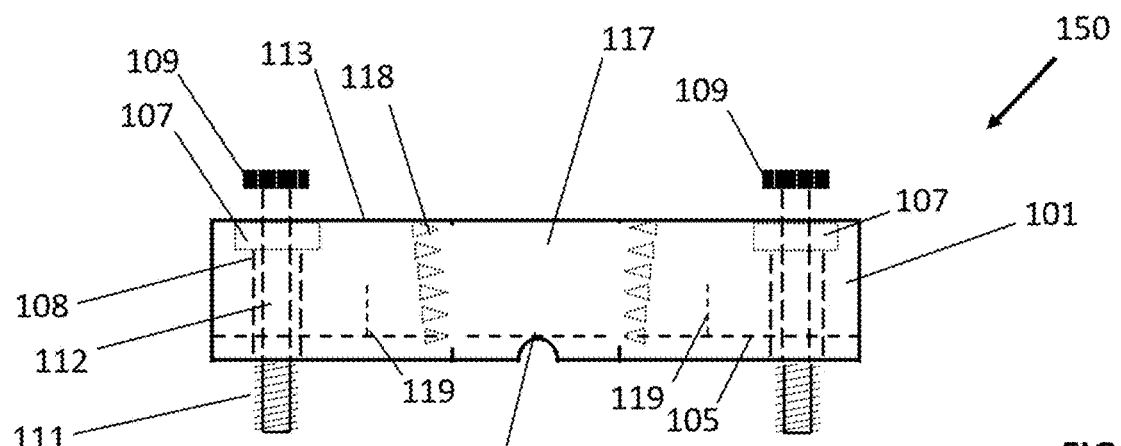
FIG. 2A and FIG. 2B are side elevation views through components of a large mechanical packer before assembly.
Figure 2B:
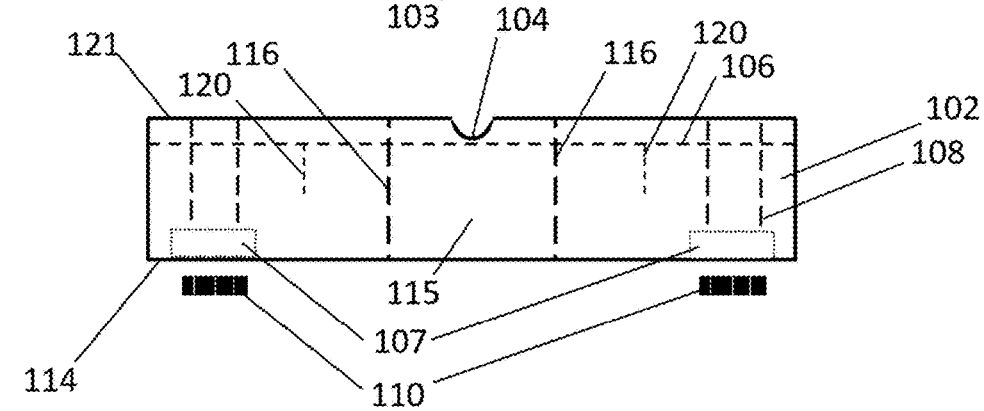

FIG. 2A and FIG. 2B are side elevation views through the housing of a large mechanical packer 150 before assembly. In this embodiment the housing components consists of an upper plate 101 and lower plate 102. A half channel 103 in the bottom of the upper plate 101 and a half channel 104 in the top 121 of the lower plate 102 form a hole or cylindrical bore when the two plates are assembled (not shown). Traces of a plurality of other channels are shown by dashed lines 105 in the bottom of the upper plate 101 in FIG. 2A and dashed lines 106 in the top of the lower plate 102 in FIG. 2B. Recessed holes 107 in the top 113 of the upper plate 101 shown in FIG. 2A and in the bottom 114 of the lower plate 102 shown in FIG. 2B connect with bolt holes 108 and accommodate bolt heads 109, bolt shanks 112, and nuts 110, such than when threads 111 on the bolt shank 112 are tightened into the nuts 110, the top surface 113 of the upper plate 101 and bottom surface 114 of the lower plate 102 have no exposed hardware when assembled together (not shown).

A vertical hole 115 in the center of the lower plate 102 is outlined by dashes 116 in FIG. 2B. A tapered vertical hole 117 with threads 118 in the center of the upper plate 101 is shown in FIG. 2A. A plurality of small vertical holes 119 in the upper plate 101 are shown by dashes in FIG. 2A and a plurality of small vertical holes 120 in the lower plate 102 are shown by dashes in FIG. 2B. The small vertical holes 119 and 120 align in the upper and lower plates 101 and 102, respectively.

FIG. 3A and FIG. 3B are overhead views of the housing of a large mechanical packer 150 before assembly. FIG. 3A is an overhead view of the top 121 of the lower plate 102 showing the plurality of larger-width channels 106 compared with smaller-width channels 122. The larger-width channels 106 extend from the outer circumference of the top 121 of the lower plate 102 into the hole 115 in the center of the lower plate 102. The smaller-width channels 122 extend from the outer circumference on the top 121 of the lower plate 102 radially inward but terminate before the hole 115 in the center of the lower plate 102 and have small-diameter holes 120 near their termination. Larger diameter bolt holes 108 are shown on the top 121 of the lower plate 102. FIG. 3B is an overhead view of the top 113 of the upper plate 101 showing the wider tapered center hole 117 (compared to the center hole 115 in FIG. 3A) and recessed holes 107 and hexagonal bolt heads 109, in this embodiment.

FIG. 4A is an overhead view of the housing for a mechanical packer 150 before assembly showing the top 121 of the lower plate 102 with a plurality of cylindrical rods 123 inserted in each of the larger-width channels 106. A plurality of extension springs 124 are shown to be inserted in the smaller-width channels 122. Small-diameter pins 125 inserted in the small-diameter holes 120 (previously shown in FIG. 3A) in the top 121 of the lower plate 102 and secure a circular end 126 of the extension springs 124 (FIG. 4B) to the lower plate 102. A plurality of discs 127 surround the lower plate 102 and are secured to a flat end 128 of the extension springs 124 and a flat end of the cylindrical rods 123 as indicated in FIG. 4B which forms a disc assembly 175. The disc assembly 175 shown in FIG. 4B is removed from the lower plate 102 when small-diameter pins 125 are not engaged with the small-diameter holes 120 (previously shown in FIG. 3A) in the top 121 of the lower plate 102.

In operation, a lateral wedge force represented by arrow 130 from the center hole 115 moves a cylindrical rod 123 in a larger-width channel 106 laterally away from the lower plate 121 as shown in FIG. 4A. Extension springs 124 in smaller-width channels 122 return the disc 127 and cylindrical rod 123 toward the center 115 of the lower plate 121 by lateral forces represented by arrows 131 from a pair of extended springs 124 when a force (represented by arrow 130) is removed. Narrow slots 129 separate the discs when contracted around the lower plate 121 (FIG. 4A).

FIG. 5 provides additional perspectives of a disc assembly 175. FIG. 5A is an overhead view of a disc assembly 175 (repeated from FIG. 4B) with the addition of two section lines A-A' and B-B'. FIG. 5B is a sectional view of the disc assembly 175 viewed from section line B-B' whereas FIG. 5C is a sectional view of the disc assembly 175 viewed from section line A-A'. A series of parallel dotted lines (132, 133, and 134) denote the front, back, and extended inside arc of the disc, respectively. The true thickness of the disc is represented by the difference between lines 132 and 133. The apparent thickness of the disc as viewed in the sectional view of FIG. 5B is the difference between vertical lines 132 and 134. The narrower perspective showing the true width of the disc 127 viewed from section line A-A' shown in FIG. 5C (i.e., the difference between lines 132 and 133) is preferred for clarity and will be used in subsequent sectional drawings along with the view of a single spring 124. Sectional views provided in FIG. 5B and FIG. 5C also show a beveled end 135 of the cylindrical rod 123.

Figure 6:
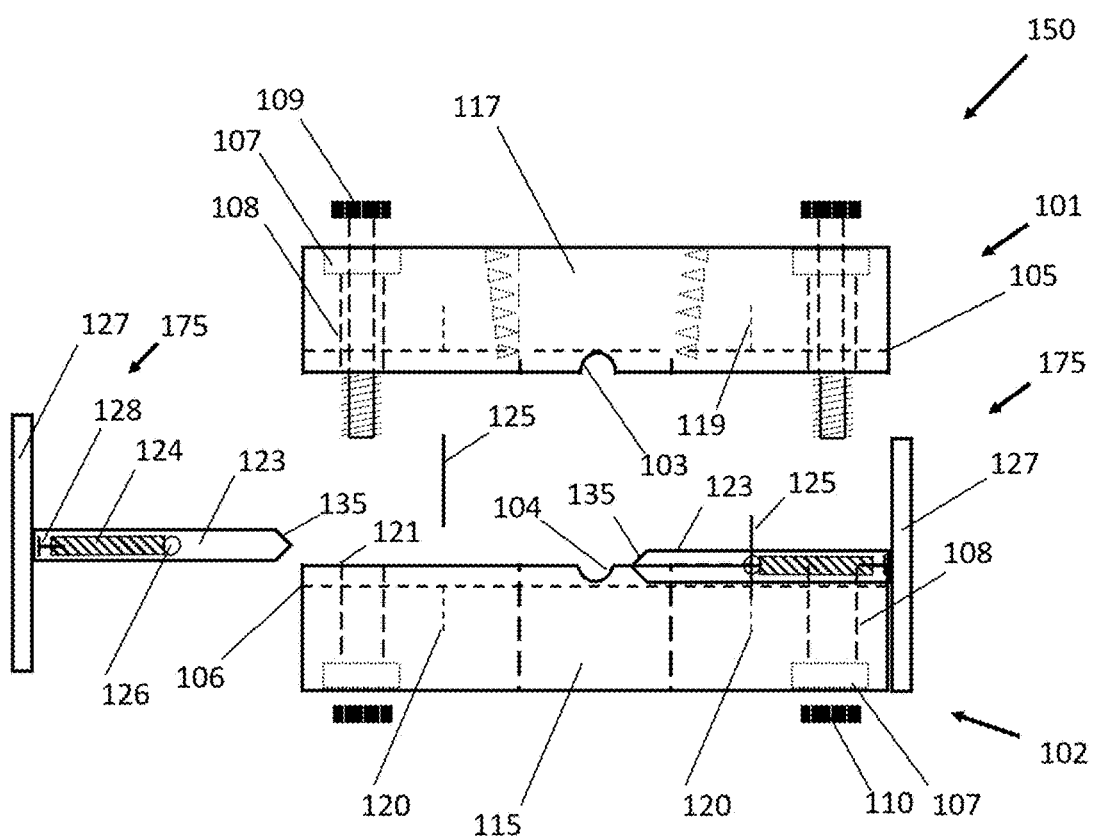
FIG. 6 is a sectional view of components of a mechanical packer before assembly.

FIG. 6 is a sectional view of the housing of a large mechanical packer 150 before assembly showing an upper plate 101 and lower plate 102 with the placement of one-disc assembly 175 in the lower plate on the right and positioning of an opposing disc assembly 175 for installation on the left. A small-diameter pin 125 has been inserted through the small hole 120 on the end of the extension spring 124 and seated into a hole 120 in the top 121 of the lower plate 102 for the installed disc assembly 175 on the right. The beveled end 135 of a cylindrical rod 123 extends into the vertical hole 115 in the center of the lower plate 102 on the right.

Figures 7A, 7B:
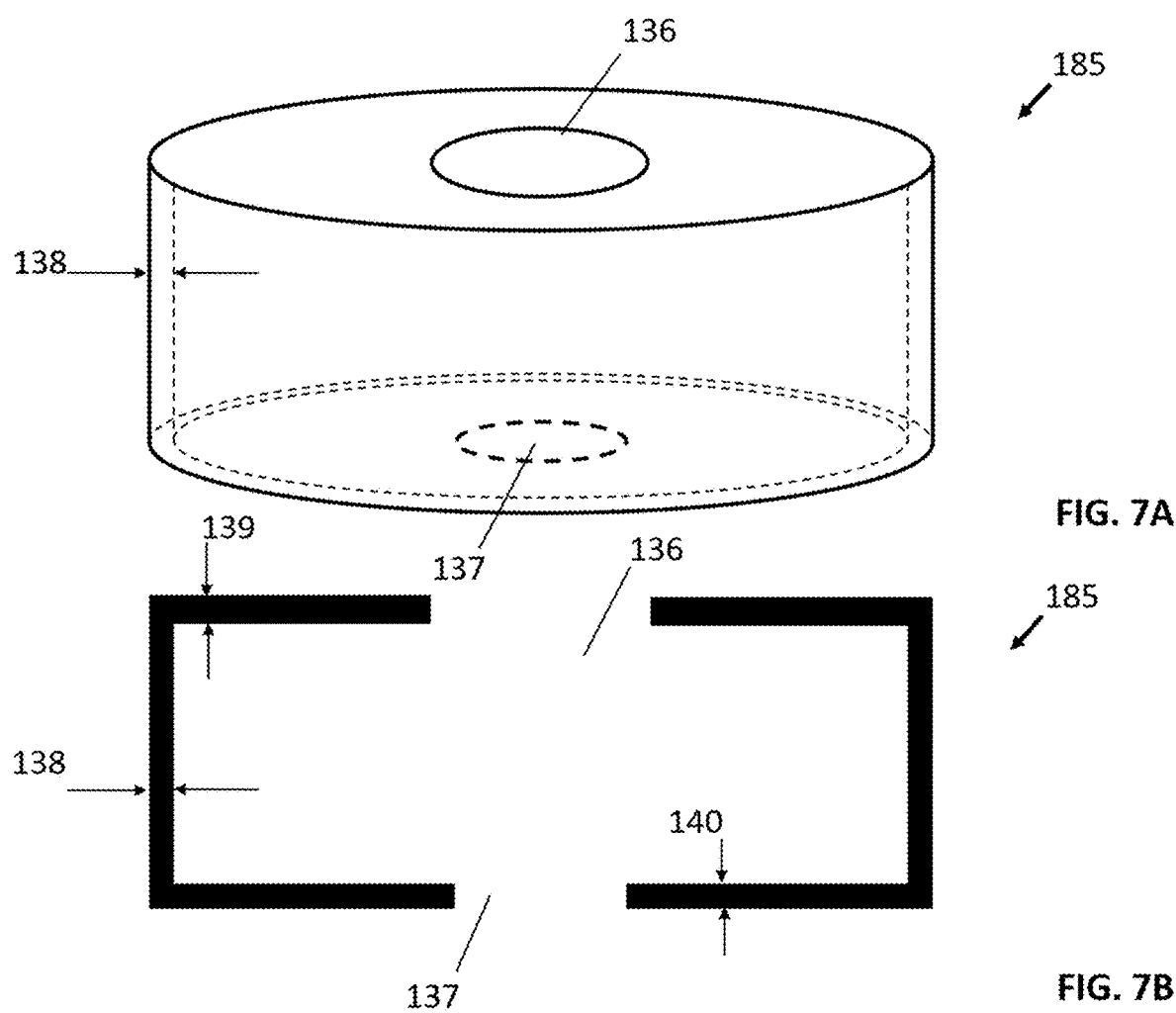
FIG. 7A is an isometric view of a formed rubber material and FIG. 7B is a sectional view of a formed rubber material used in a large mechanical packer.

FIG. 7A is an isometric view of a formed rubber material 185 (i.e., a flexible elastomeric element such as natural rubber or a wide variety of synthetic rubber such as ethylene propylene diene monomer [EPDM] or styrene-butadiene rubber [SBR]) that has desired mechanical and chemical properties for the specific application for which a large packer assembly 100 is to be deployed). In one embodiment of a large packer assembly 100, a formed rubber material 185 is cylindrically shaped (FIG. 7A) with a slightly wider top opening 136 than bottom opening 137. FIG. 7B is a sectional view of a formed rubber material 185 for the same perspective shown in FIG. 7A. The wall thickness 138 is shown to be the same as the top 139 and bottom 140 thicknesses (FIG. 7B) in this embodiment.

Figure 8:
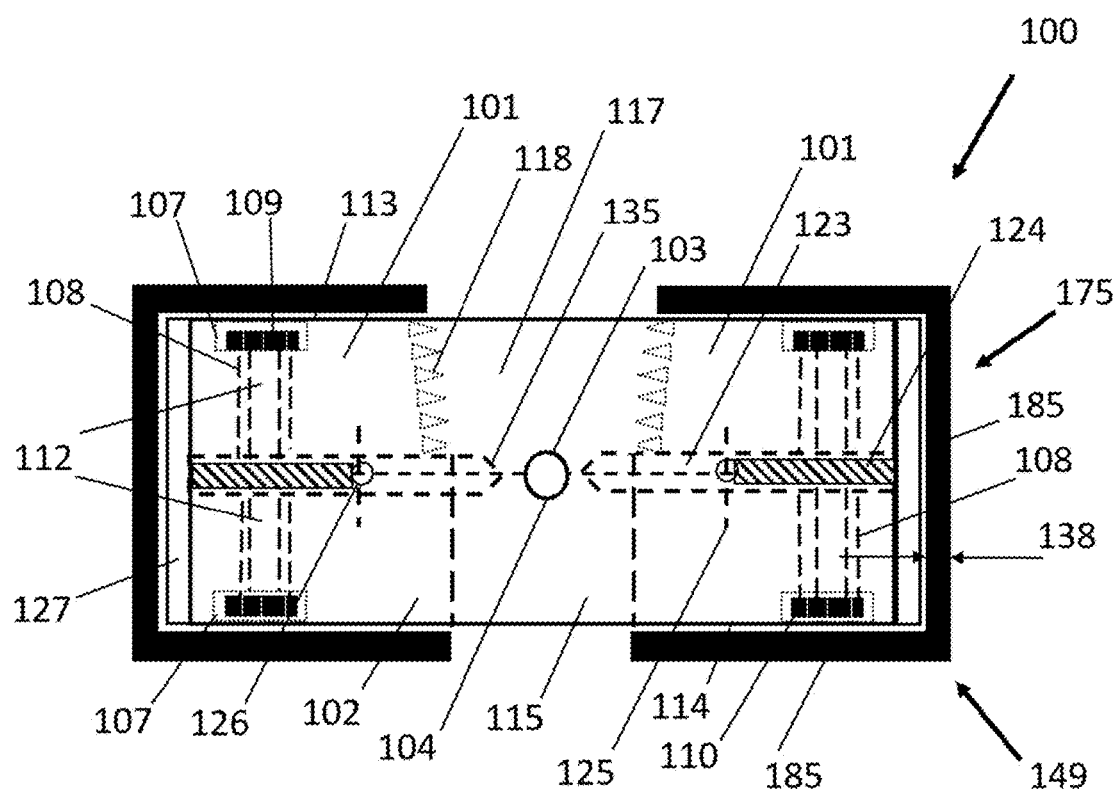
FIG. 8 is a sectional view through the center of a large packer assembly encased within a formed rubber material in a retracted or non-activated state.

FIG. 8 is a sectional view through the center of a large packer assembly 100 encased within a formed rubber material 185. The large packer assembly 100 is in a retracted or non-activated state 149 as noted by position of the cylindrical rods 123 where the beveled ends 135 of the cylindrical rods 123 are near the center of the vertical hole 115 in the center of the lower plate 102 and near the center of the tapered vertical hole 117 with threads 118 in the center of the upper plate 101. The bolt heads 109 have been assembled in the recessed holes 107 in the top 113 of the upper plate 101 and the bolt shank 112 extends through the bolt holes 108 in the upper plate 101 and lower plate 102 where threads 111 (not shown) near the bottom of the bolt shank 112 are secured to nuts 110 in the recessed holes 107 in the bottom 114 of the lower plate 102 such than when threads 111 (not shown) on the bolt shank 112 are tightened into the nuts 110, the upper plate 101 and lower plate 102 are detachably secured to each other holding the plurality of inner works (i.e., cylindrical rods 123, extension springs 124, small-diameter pins 125, and disc assemblies 175) in their respective channels, holes, and positions shown in FIG. 8. The resulting large packer assembly 100 shown in FIG. 8 has no exposed hardware allowing for a smooth surface on which a formed rubber material 185 can operate without interference or damage.

Figure 9:
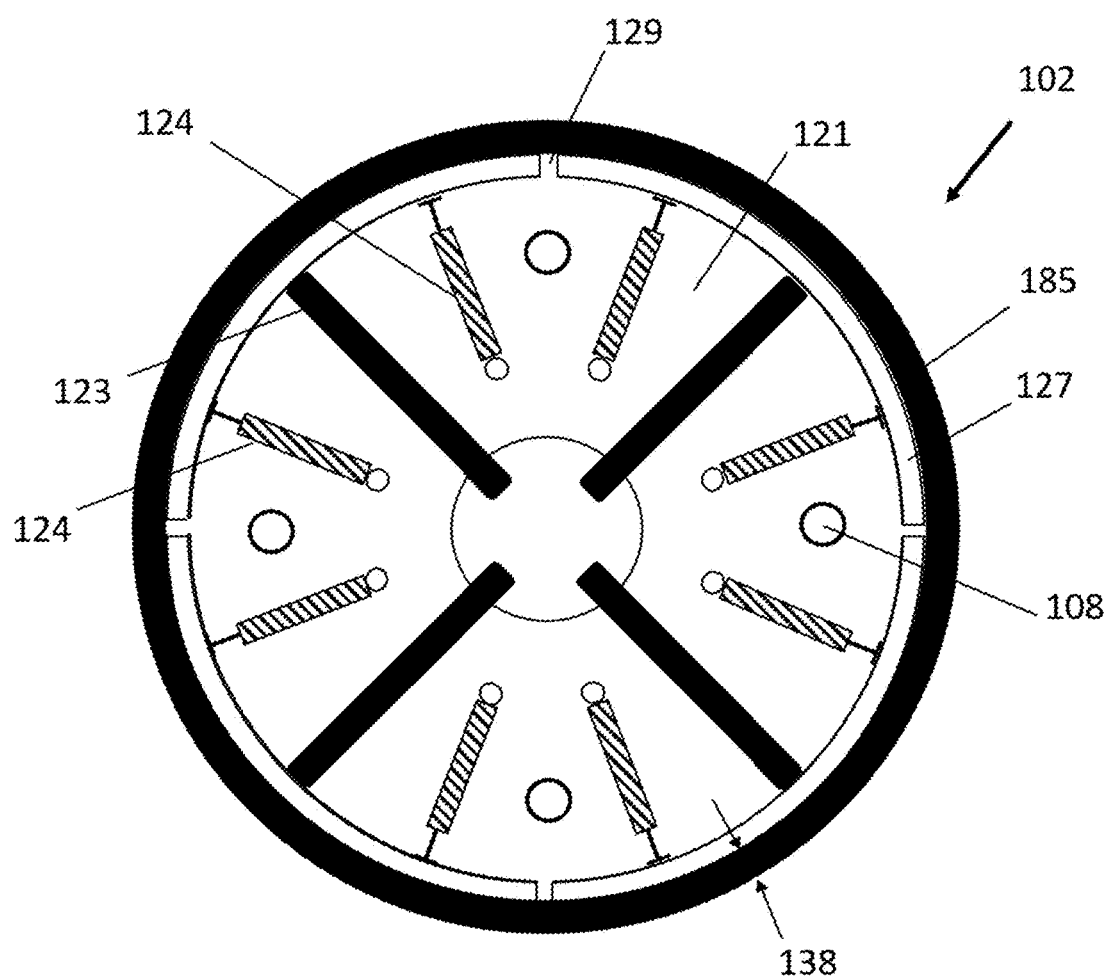
FIG. 9 is an overhead view of the top of a lower plate of a packer assembly.

FIG. 9 is an overhead view of the top 121 of a lower plate 102 showing the width 138 of a rubber material 185 surrounding a plurality of discs 127 separated from each other by narrow 129 slots. The previously described cylindrical rods 123, extension springs 124, and bolt holes 108 are also shown.

Figure 10:
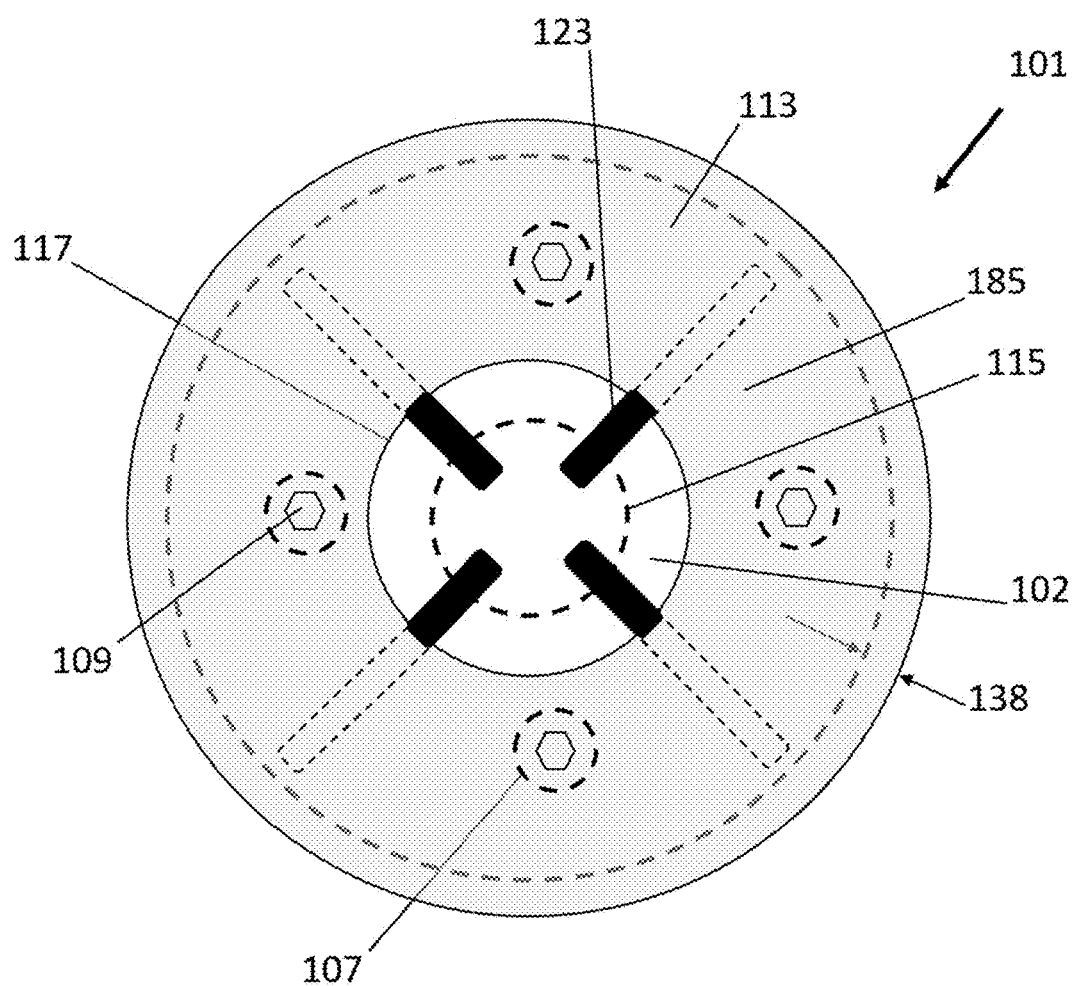
FIG. 10 is an overhead view of the top of an upper plate of a packer assembly.

FIG. 10 is an overhead view of the top 113 of an upper plate 101 showing a rubber material 185 covering all but the tapered vertical hole 117 in the center of the upper plate 101 (with threads 118 not shown) and the vertical hole 115 in the center of the lower plate 102. The wall thickness 138 of a formed rubber material 185 is shown along with the exposed ends of the cylindrical rods 123 visible in the tapered vertical hole 117 in the center of the upper plate 101. Bolt heads 109 set in recessed holes 107 in the top 113 of the upper plate 101 are also shown beneath the covering of a formed rubber material 185.

Figure 11:
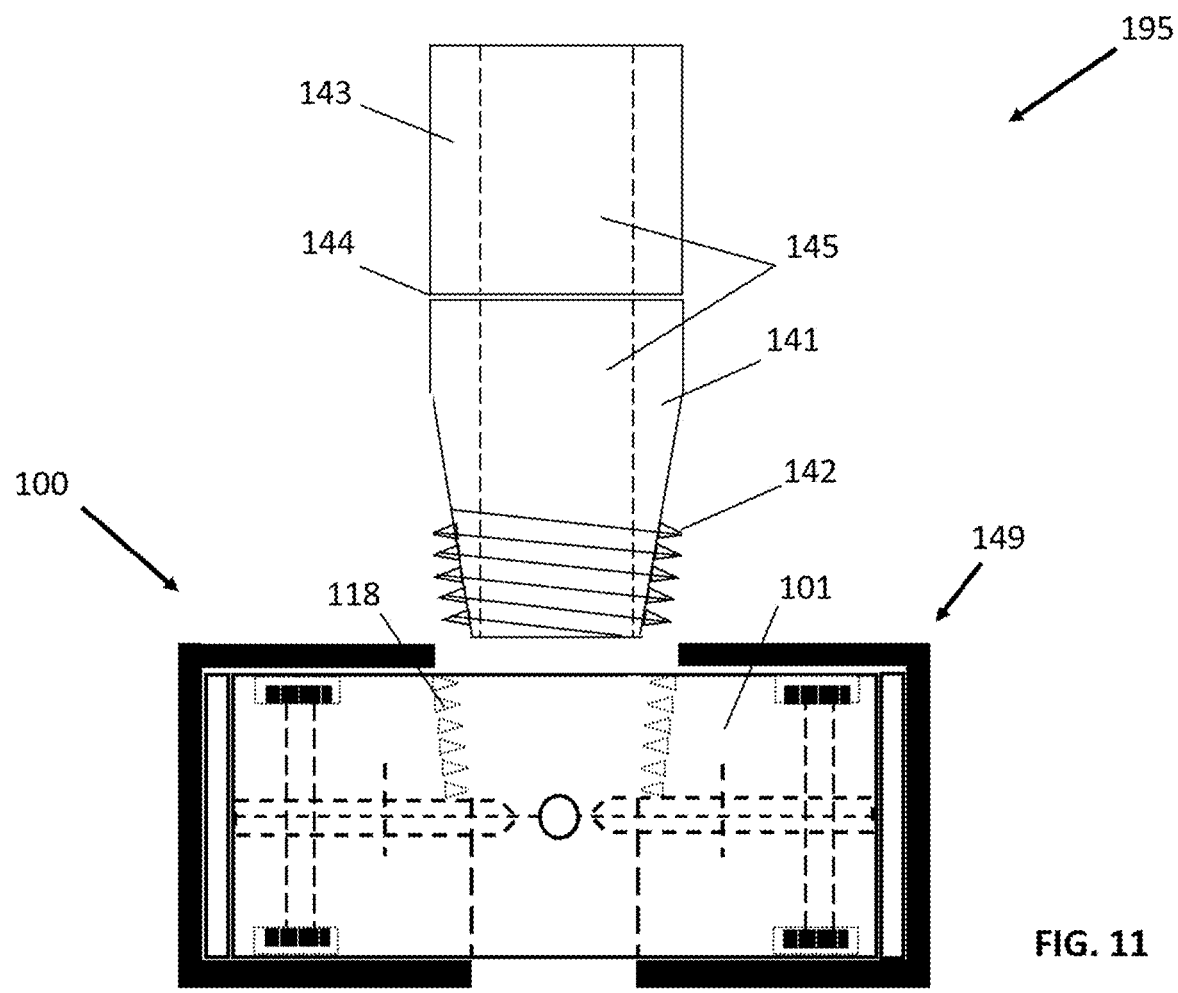
FIG. 11 is a cross sectional view of a completed larger packer assembly in a retracted or non-activated state with a packer stem assembly positioned above it.

FIG. 11 is a cross sectional view of a completed larger packer assembly 100 in a retracted or non-activated state 149. A hollow core sub 141 or equivalent is positioned above the completed packer assembly 100 with tapered threads 142 to match the threads 118 in the center of the upper plate 101. A hollow core stem 143 or equivalent is shown to be connected at a joint 144 with a sub 141 (method of connection not shown). The inside or core of a stem 143 and a sub 141 are both hollow 145 thus referenced as hollow core stems 143 or hollow core subs 141. The total length of a hollow core stem 143 or individual sections of hollow core stems 143 are variable to match site conditions during operation. Sections of hollow core stems 143 that may be of variable length when connected to a hollow core sub 141 for operation are referred to herein as a packer stem assembly 195.

Figure 12:
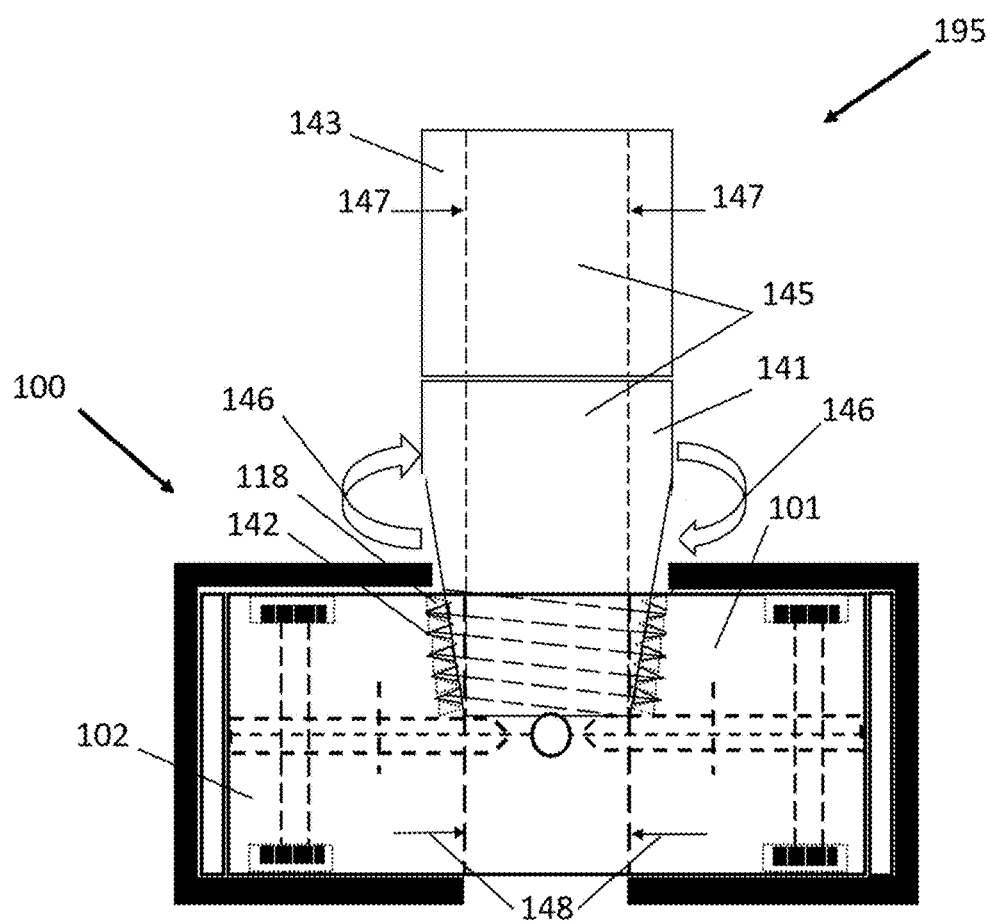
FIG. 12 is a cross sectional view of a completed larger packer assembly in a retracted or non-activated state engaged with a packer stem assembly.

FIG. 12 is a cross sectional view of a completed larger packer assembly 100 in a retracted or non-activated state 149 engaged with a packer stem assembly 195. Clockwise rotation of a packer stem assembly 195 shown by arrows 146 with the completed large packer assembly 100 results in a full engagement of tapered threads 142 on a hollow core sub 141 with threads 118 in the center of the upper plate 101. The inside diameter 147 of a packer stem assembly 195 is the same as the inside diameter 148 in a lower plate 102. In operation, the engagement or disengagement of the hollow core sub 141 with the completed large packer assembly 100 may be below a ground surface or above a ground surface and at any inclination (not shown).

FIG. 13 is a cross sectional view of different embodiments of a cylindrical tool for activating or deactivating packers (the tool is referred to herein as a packtivator). A packtivator is used when a completed packer assembly (not shown) is placed in position by a packer stem assembly 195 (not shown) and a mechanical packer needs to be operated (i.e., expanded or in an activated state) to seal a casing or borehole (not shown). A packtivator consists of subs (three of which are shown in FIG. 13) and stems (two embodiments of which are shown in FIG. 14) that can be interconnected by threading or other means to form a packtivator assembly. Packtivator subs and stems may have small or large diameters to activate or deactivate small or large diameter packer assemblies, respectively, and may have hollow or solid cores. As described later in the present disclosure, a small packer assembly can reside on a hollow core packtivator sub and be actuated by a smaller diameter solid core packtivator sub inserted on the inside of a larger hollow core packtivator sub. Packtivator subs and stems have generally similar geometry and function, but with subtle differences described for the embodiments in the present disclosure.

Figure 13A:
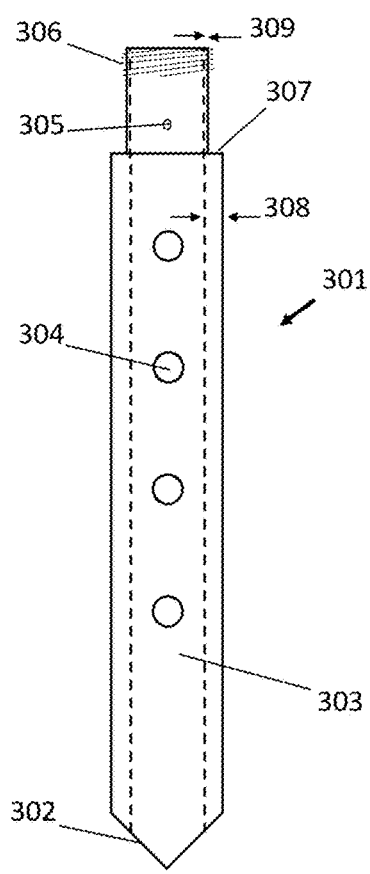
FIG. 13A through FIG. 13C are cross sectional views of three different embodiments of components (subs) of a cylindrical tool for activating or deactivating mechanical packers, referred to herein as a packtivator.

FIG. 13A is a cross sectional view of one embodiment of a hollow core packtivator sub 301. The hollow core packtivator sub 301 is shown as a relatively short segment of pipe or equivalent the lower tip 302 of which is beveled to match the beveled ends 135 of the cylindrical rods 123 in a completed packer assembly (previously shown in FIG. 8). In one embodiment a packtivator sub 301 is hollow 303 throughout its length and a plurality of holes 304 go through the packtivator sub 301 horizontally to allow fluid flow (not shown). Smaller diameter holes, such as that shown by 305, are below a treaded end 306 at the top of a packtivator sub 301. A circular seat 307 is shown in FIG. 13A that is formed between the wider wall thickness 308 of a hollow core packtivator sub 301 compared with the thinner wall thickness 309 in the upper threaded 306 section of a hollow core packtivator sub 301.

Figure 13B:
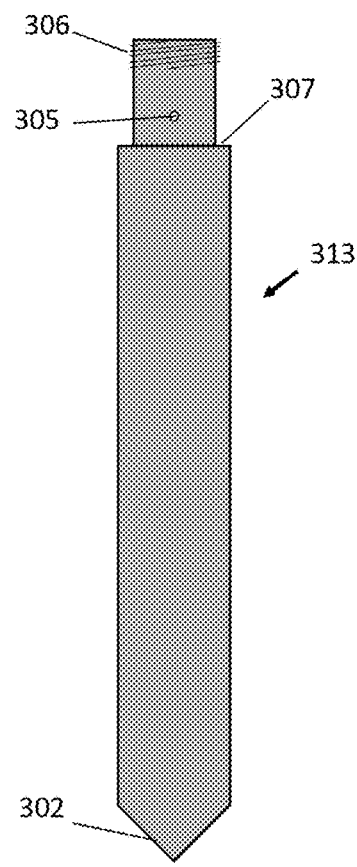

FIG. 13B is a cross sectional view of a second embodiment of packtivator sub 313 used for activating or deactivating packers which is solid throughout its length and does not permit fluid flow within its core. As with the hollow core packtivator sub 301 (FIG. 13A), a solid core packtivator sub 313 is a short segment of pipe or equivalent the lower tip 302 of which is beveled to match the beveled ends 135 of the cylindrical rods 123 in a completed packer assembly (previously shown in FIG. 8). Smaller diameter holes, such as that shown by 305, are below a treaded end 306 at the top of a packtivator sub 313 and a circular seat 307 is in the upper threaded 306 section as shown in FIG. 13B.

Figure 13C:
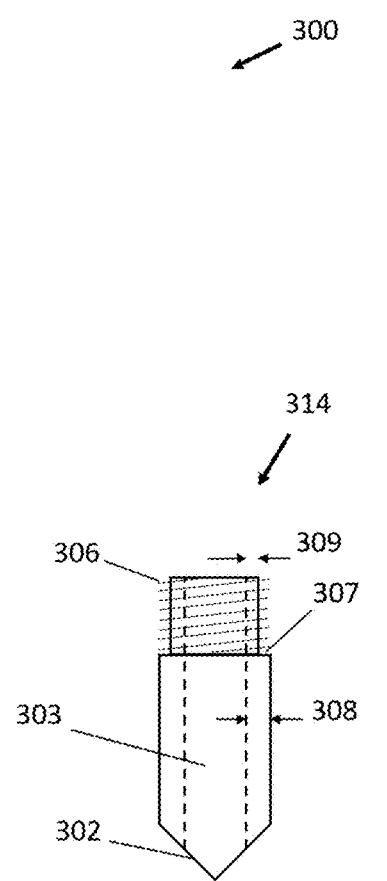

FIG. 13C is a cross sectional view of a third embodiment of packtivator sub 314 used for activating or deactivating packers which is hollow throughout its length to permit fluid flow within its core. The hollow core packtivator sub 314 is shown to be substantially shorter in length compared with packtivator subs 301 and 313 for different purposes described later in the present disclosure. As with the other packtivator subs 301 and 313, a packtivator sub 314 is an even shorter segment of pipe or equivalent the lower tip 302 of which is beveled to match the beveled ends 135 of the cylindrical rods 123 in a completed packer assembly (previously shown in FIG. 8). A threaded end 306 at the top of a hollow core packtivator sub 314 extends to a circular seat 307 as shown in FIG. 13C. In a fourth embodiment a packtivator sub may be similar to 314 except have a solid core to prevent fluid flow within its core (not shown but a solid core packtivator sub is described later in the present disclosure).

FIG. 14 is a cross sectional view of two embodiments of packtivator stems. In FIG. 14A a packtivator stem 310 is hollow 303 throughout its length and has threads 311 in its lower section. The upper section of a hollow core packtivator stem 310 is fully threaded 312 (i.e., no seat 307 as in packtivator subs 301, 313, or 314). A packtivator stem 315 shown in FIG. 14B is similar to packtivator stem 310 except that it is solid throughout its length (i.e., a solid core packtivator stem 315).

Packtivator stems can be connected with each other to achieve a desired length to match site conditions during operation (i.e., connecting threads 311 in the lower section of one stem to threads 312 in the upper section of another stem). In most operations, a hollow core packtivator stem 310 would connect by lower threads 311 to upper threads 306 of a hollow core packtivator sub (301 or 314) and a solid core packtivator stem 315 would connect by lower threads 311 to upper threads 306 of a solid core packtivator sub 313. However, the packtivator subs and stems are interchangeable, and for example, a hollow core packtivator stem 310 could be connected to a solid core packtivator sub 313 (e.g., to reduce the weight of an entire packtivator assembly).

Figure 15:
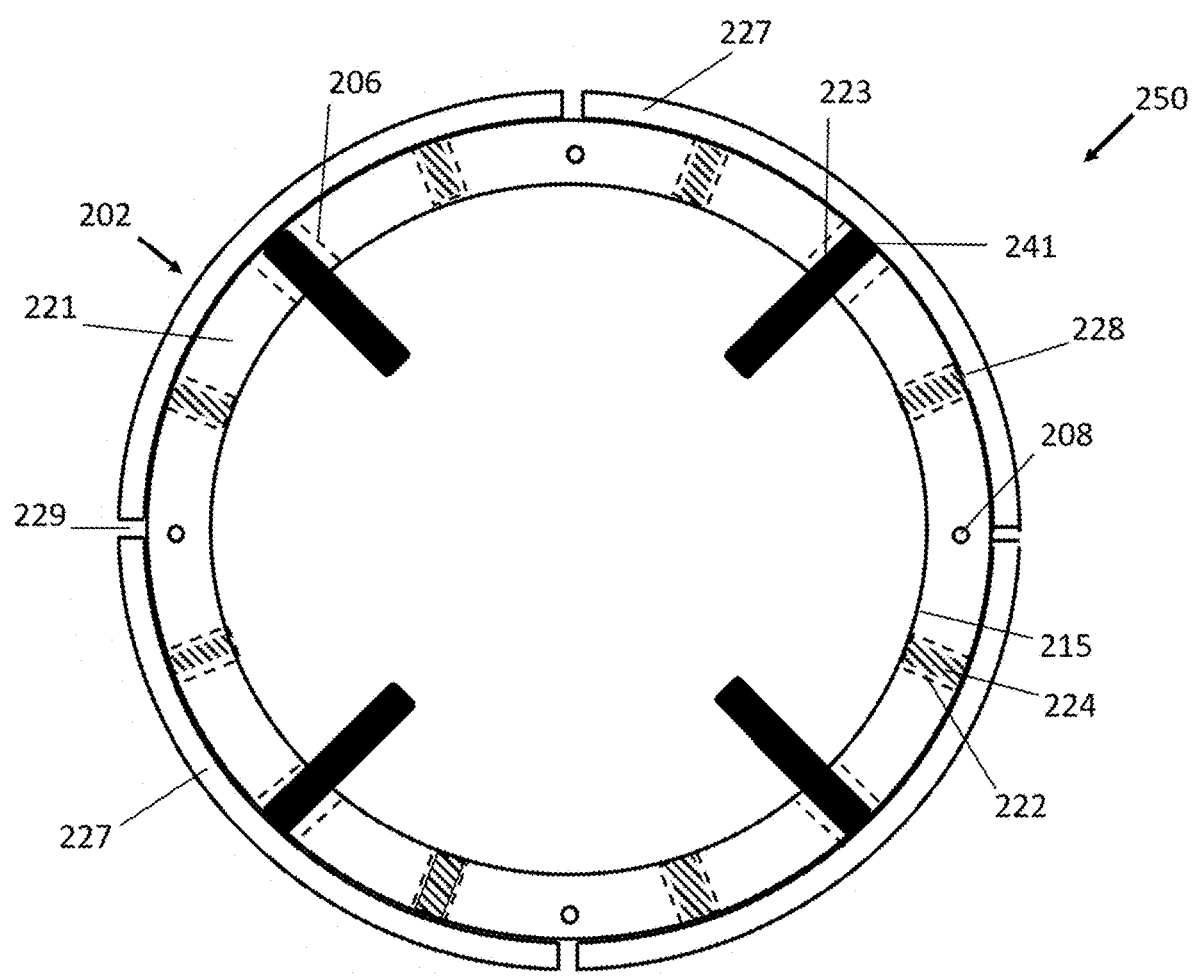
FIG. 15 is an enlarged overhead view of the some of the components of a small mechanical packer before assembly.

FIG. 15 is an enlarged overhead view of the some of the housing and key components of a small mechanical packer before assembly 250. As previously described in the present disclosure, a small packer assembly 200 may be on the order of 2-inches in diameter relative to a large packer assembly 100 which may be on the order of 12-inches in diameter (FIG. 1). The components of the smaller packer assembly 200 and larger packer assembly 100 are similar in shape and function with a few exceptions as described below and in the following figures. Other shapes, sizes, and embodiments can be envisioned beyond those referenced in the present disclosure.

FIG. 15 shows the top 221 of a lower plate 202 with a plurality of cylindrical rods 223 inserted in larger-width channels 206. A plurality of intervening extension springs 224 are inserted in smaller-width channels 222. A plurality of discs 227 surround a lower plate 202 separated by small slots 229 and are secured to flat ends 228 of extension springs 224 and flat ends 241 of cylindrical rods 223. A plurality of bolt holes 208 are shown in a top 221 of a lower plate 202.

Figure 16:
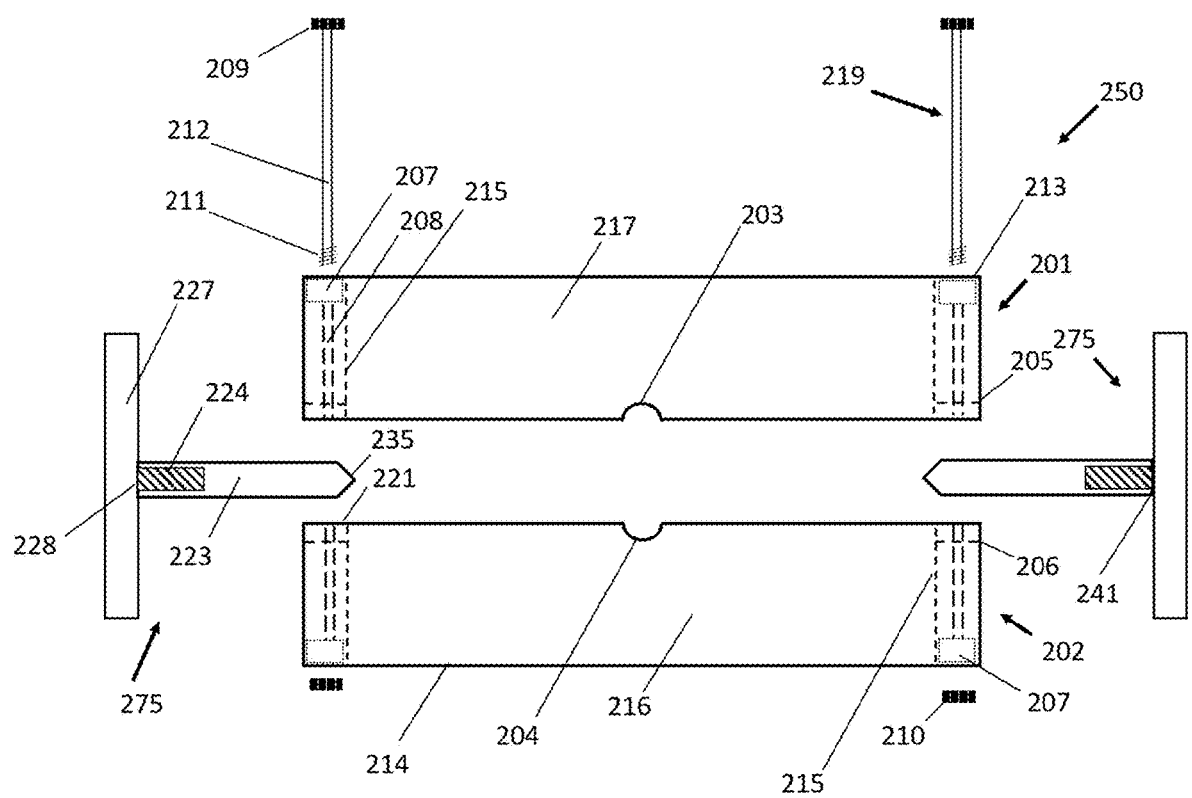
FIG. 16 is a sectional view of most of the components of a small mechanical packer before assembly.

FIG. 16 is a sectional view of the housing and most of the components of a small mechanical packer before assembly 250. In this embodiment the components consists of an upper plate 201 and lower plate 202. A channel 203 in the bottom of the upper plate 201 and a channel 204 in the top 221 of the lower plate 202 form a hole or bore when the two plates are assembled (not shown). Traces of a plurality of other channels are shown by dashed lines 205 in the bottom of the upper plate 201 and dashed lines 206 in the top of the lower plate 202. Recessed holes 207 in the top 213 of the upper plate 201 and in the bottom 214 of the lower plate 102 connect with bolt holes 208 and accommodate bolt heads 209, bolt shanks 212, and nuts 210, such than when a bolt 219 is tightened into a nut 210, the top surface 213 of the upper plate 201 and bottom surface 214 of the lower plate 202 have no exposed hardware when assembled (not shown).

A vertical hole 216 in the center of the lower plate 202 is outlined by dashes 215 in FIG. 16. Unlike the large packer (which has a tapered vertical hole 117 with threads 118 in the center of the upper plate 101 as previously shown in FIG. 2A), the vertical hole 217 in the upper plate 201 outlined by dashes 215 of the small packer is the same diameter as in the lower plate 202 and without threads (FIG. 16). A disc assembly 275 for a small packer is defined by a disc 227, at least two extension springs 224, and a cylindrical rod 223. The discs 227 are secured to flat ends 228 of extension springs 224 and flat ends 241 of cylindrical rods 223 (FIG. 16).

Figure 17A:
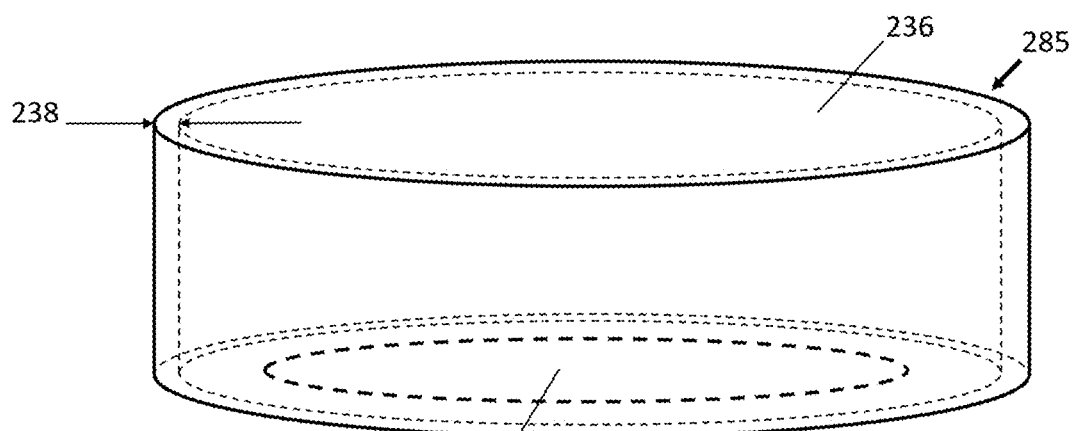
FIG. 17A is an isometric view of a formed rubber material and FIG. 17B is a sectional view of a formed rubber material for a small mechanical packer.
Figure 17B:
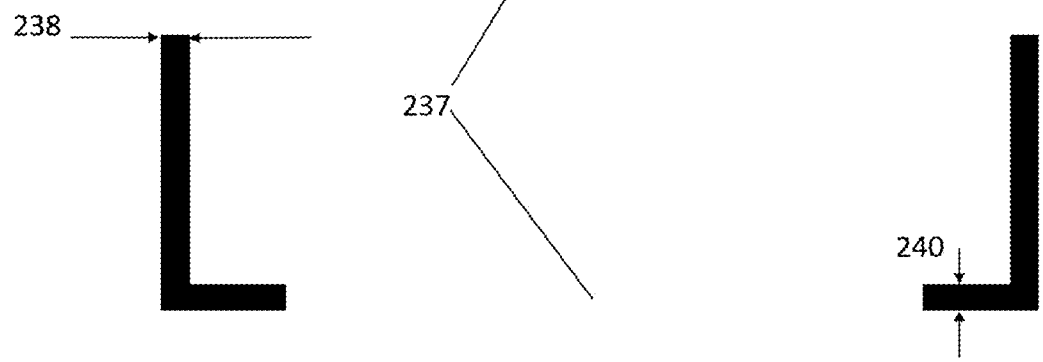

FIG. 17A is an isometric view of a formed rubber material 285 (i.e., a flexible elastomeric element such as natural rubber or a wide variety of synthetic rubber such as ethylene propylene diene monomer [EPDM] or styrene-butadiene rubber [SBR]) that has desired mechanical and chemical properties for the specific application) for which a small packer assembly 200 is to be deployed. In one embodiment of a packer assembly 200, a formed rubber material 285 is cylindrically shaped (FIG. 17A) with a wide top opening 236 relative to the bottom opening 237. FIG. 17B is a sectional view of a formed rubber material 285 for the same perspective shown in FIG. 17A. The wall thickness 238 is shown to be the same as the bottom thickness 240 (FIG. 17B) in this embodiment.

Figure 18:
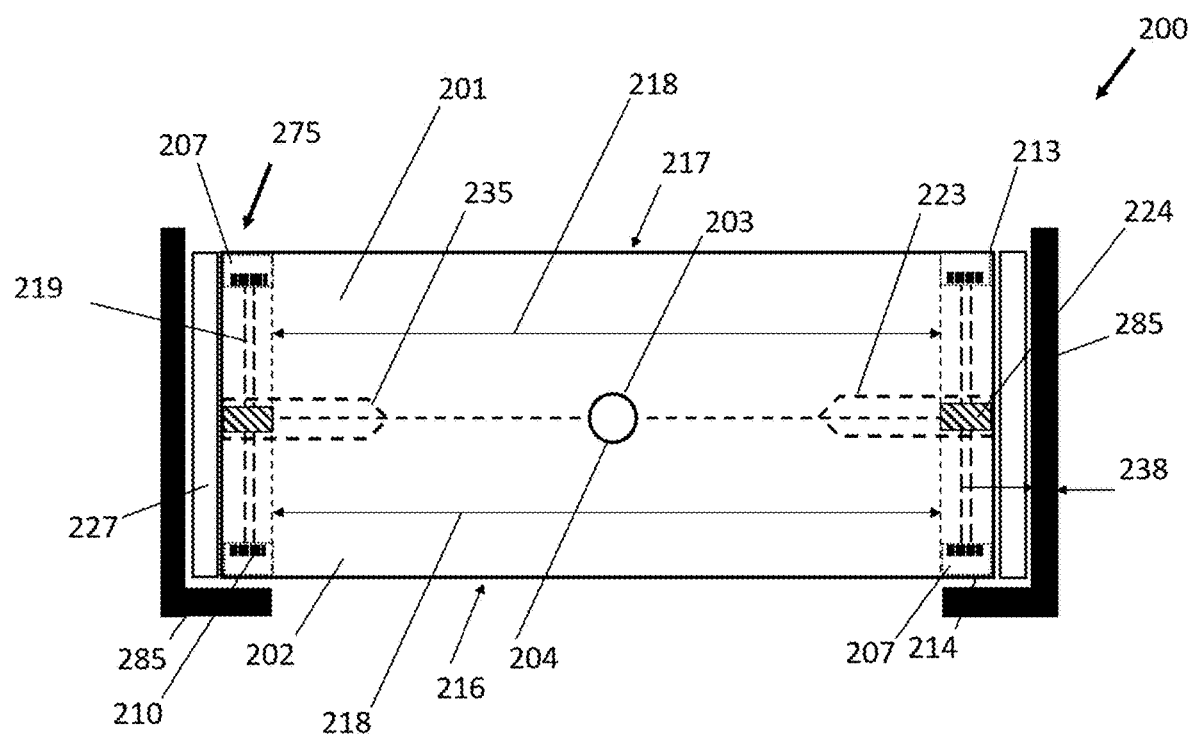
FIG. 18 is a sectional view through the center of a small packer assembly encased within a formed rubber material in a retracted or non-activated state.

FIG. 18 is a sectional view through the center of a small packer assembly 200 encased within a formed rubber material 285. The small packer assembly 200 is in a retracted or non-activated state 275 as noted by position of the discs 227 in contact with the upper 201 and lower 202 plates. As previously discussed, the vertical holes 216 and 217 in the center of the lower and upper plates 202 and 201, respectively, are the same inside diameter 218 (i.e., there is no tapering or threading as in the embodiment of the large packer 100 previously described).

The bolts 219 shown in FIG. 18 have been assembled in the recessed holes 207 in the top 213 of the upper plate 201 and are screwed into nuts 210 in the recessed holes 207 in the bottom 214 of the lower plate 202 such than when a bolt 219 is tightened into a nut 210, an upper plate 201 and a lower plate 202 are detachably secured to each other holding the inner works (i.e., cylindrical rods 223, extension springs 224, and disc assembly 275) in their respective channels and positions shown in FIG. 18. The resulting small packer assembly 200 shown in FIG. 18 has no exposed hardware allowing for a smooth surface on which a formed rubber material 285 can operate without interference.

Figure 19:
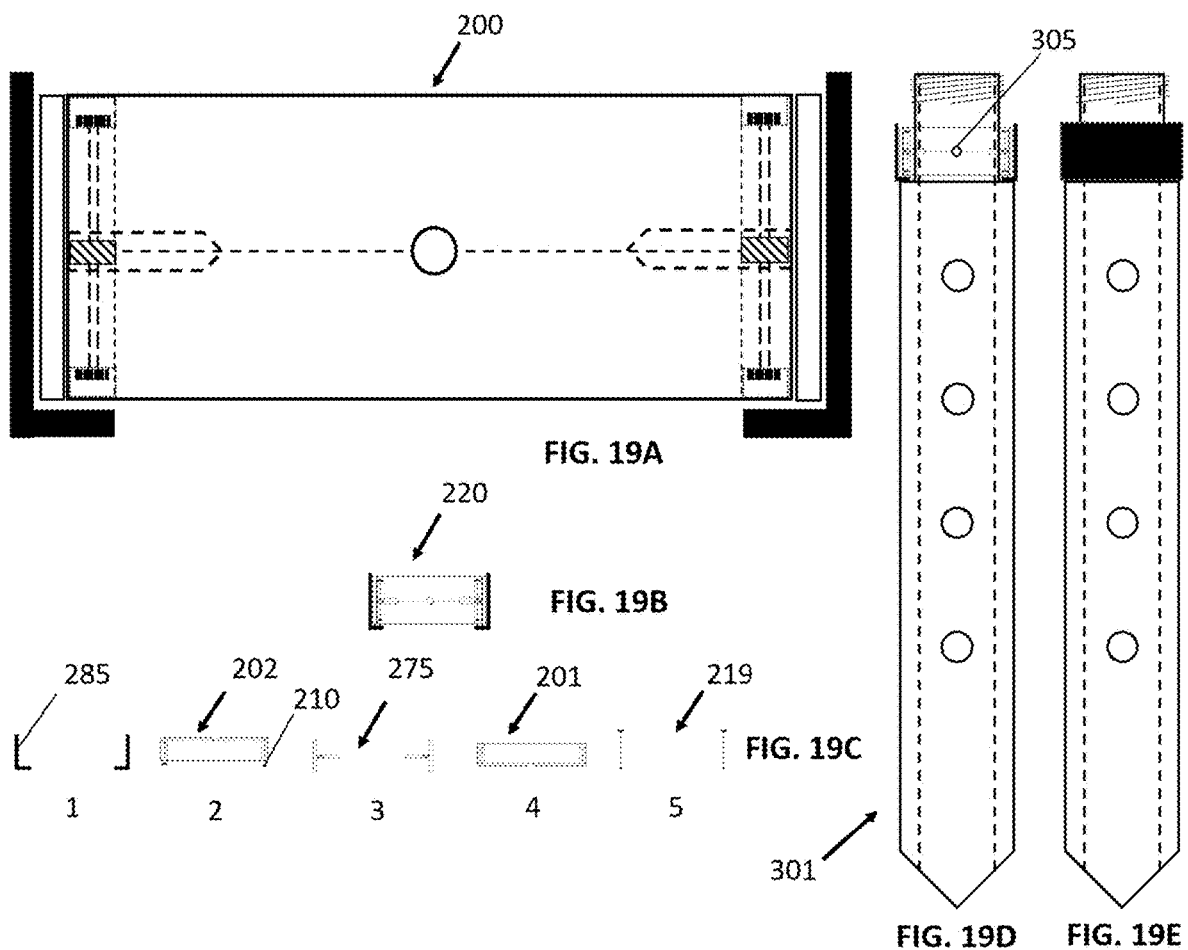
FIG. 19A is a sectional view through the center of a small packer assembly at an expanded scale and contrasted to a same small packer assembly drawn at a reduced scale and shown in a sectional view in FIG. 19B.
FIG. 19C is a sectional view of the key components of a small packer showing a sequence of steps that may be used to install a small packer on a packtivator sub.
FIG. 19D and FIG. 19E are sectional views of packtivator subs with small packer assemblies installed.

FIG. 19A is a sectional view through the center of a small packer assembly 200 drawn at the same expanded scale previously illustrated in FIG. 18 and contrasted to a same small packer assembly drawn at a reduced scale 220 in FIG. 19B. The key components of a small packer are shown in FIG. 19C in a sequence of five steps that may be used to install a small packer near the top of a hollow core packtivator sub 301 as shown assembled in a central sectional view in FIG. 19D. Step 1 of FIG. 19C involves placing a formed rubber material 285 on a circular seat 307 (previously shown in FIG. 13A) on the hollow core packtivator sub 301. Step 2 involves placing a lower plate 202 with pre-set nuts 210 on a formed rubber material 285 on the formed rubber material 285 on the circular seat 307 of the hollow core packtivator sub 301. Step 3 involves inserting cylindrical rod assemblies 275 into holes 305 below a threaded end at the top of a hollow core packtivator sub 301 (temporarily folding down the sides of a formed rubber material 285 as needed for cylindrical rod assemblies 275 to fit into holes 305 near the top of the packtivator subs and also resting in the wide channels 206 previously shown in FIG. 15). Step 4 involves placing an upper plate 201 on top of a lower plate 202 such that the wide channels and narrow channels (shown in FIG. 15) align creating bores for the operation of the cylindrical rods 223 and extension springs 224. Step 5 involves inserting and tightening bolts 219 to complete a small packer assembly 200 in place on a seat below a treaded end near the top of a hollow core packtivator sub 301 (FIG. 19D). FIG. 19E shows an off-centered sectional view of the hollow core packtivator sub 301 with a small packer assembly 200 in place where only the sides of a formed rubber material 285 are visible (covering the inner workings of the small packer assembly shown in FIG. 19D).

Figure 20:
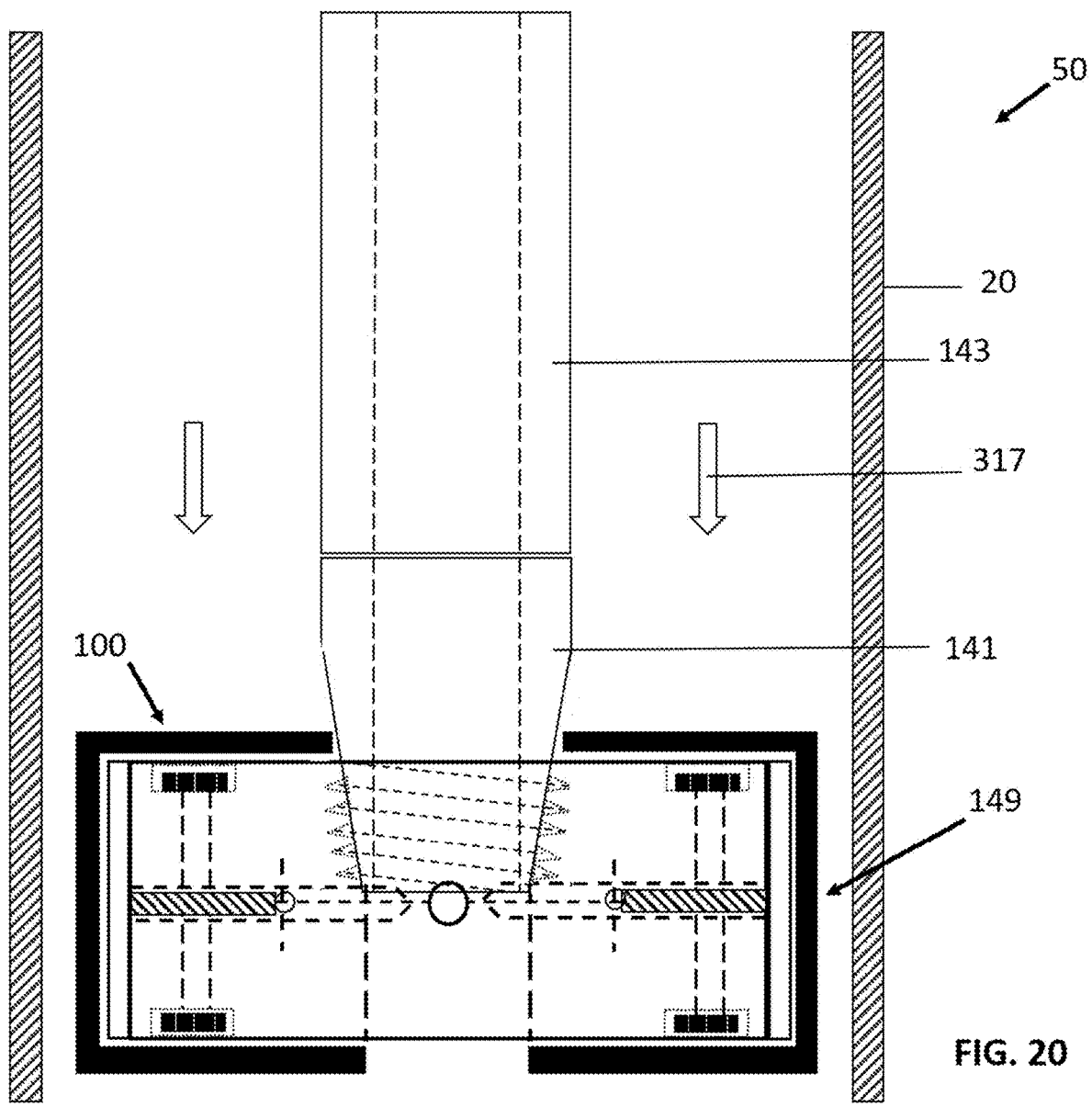
FIG. 20 is a sectional view of an example application of a large packer assembly in an inactivated state being lowered inside a casing by a packer stem assembly.

FIG. 20 shows a sectional view of an example application 50 of a large packer assembly 100 being lowered 317 inside a cylindrical casing 20 by a hollow core packer sub 141 connected to a hollow core packer stem 143. A large packer assembly 100 is in a retracted or non-activated state 149 as required until in position at a desired elevation (not shown).

Figure 21:
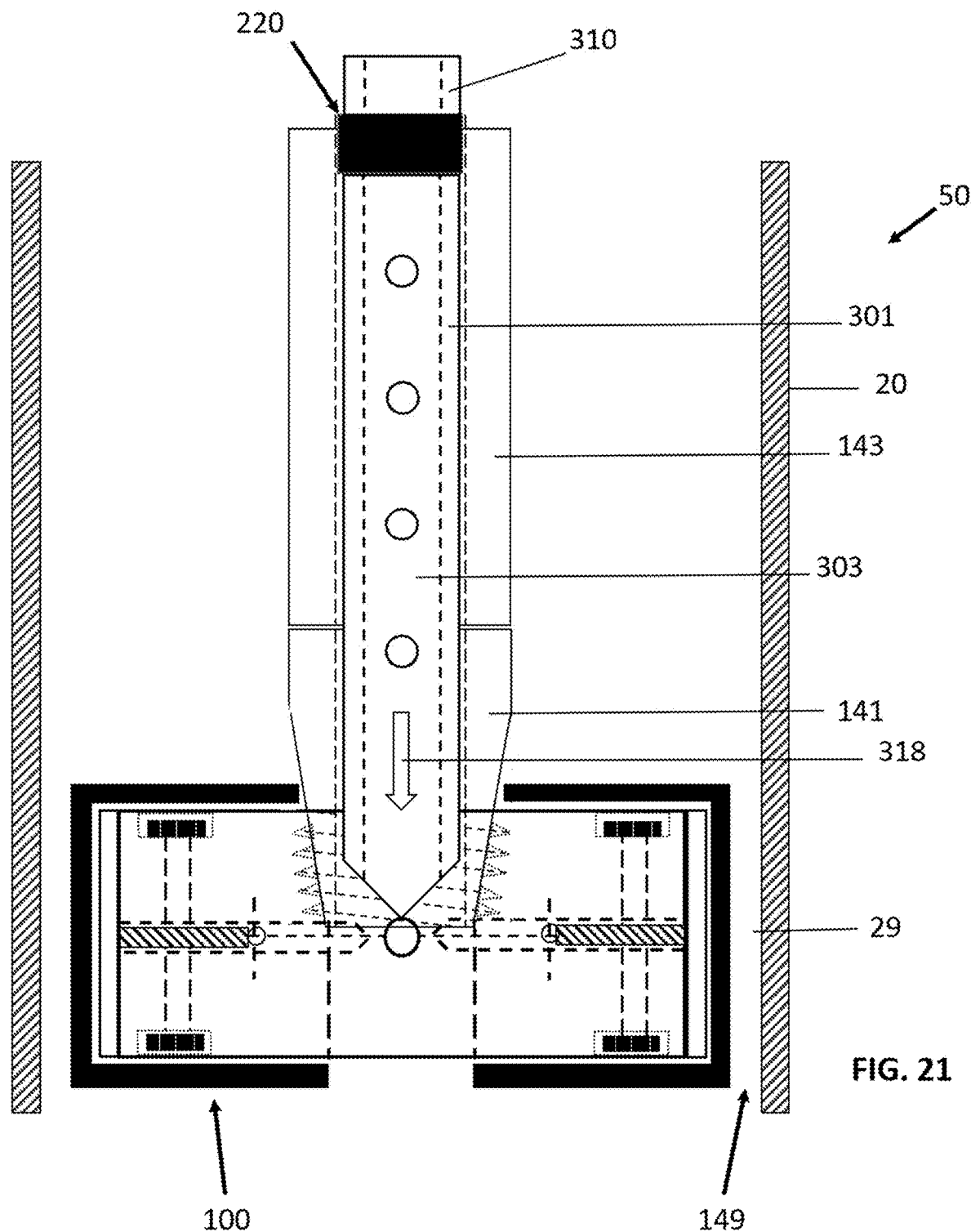
FIG. 21 is a sectional view of an example application of a large packer assembly in an inactivated state at a desired elevation inside a casing. A packtivator and small packer assembly are being lowered through a packer stem assembly.

FIG. 21 shows a sectional view of an example application 50 of a large packer assembly 100 in a retracted or non-activated state 149 at a desired elevation inside a cylindrical casing 20. A hollow core packtivator sub 301 is being lowered 318 inside a hollow core packer stem 143 and hollow core packer sub 141. A small packer assembly 220 is shown at the top of a hollow core packtivator sub 301 in FIG. 21. An annular space 29 is shown between large packer assembly 100 and the inside walls of the casing 20 during a retracted or non-activated state 149 of the large packer assembly 100.

Figure 22:
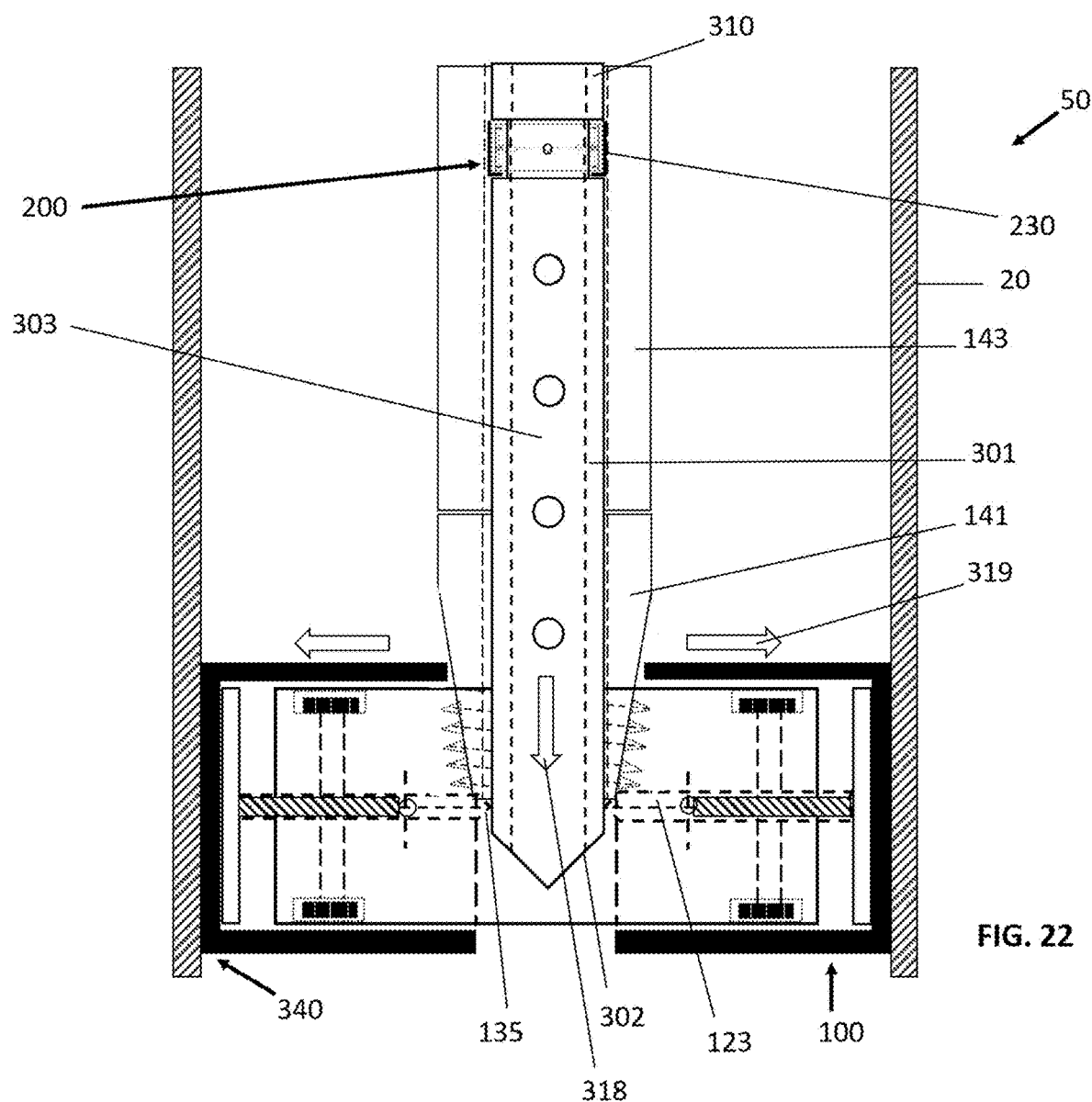
FIG. 22 is a sectional view of an example application of a large packer assembly in an activated state inside a casing while a small packer assembly remains in an inactivated state.

FIG. 22 shows a sectional view of an example application 50 of a large packer assembly 100 in an activated state 340 as noted by lateral extension 319 of the key packer components previously described as a hollow core packtivator sub 301 is pressed downward 318 engaging a beveled end of a hollow core packtivator sub 302 with the beveled ends 135 of a plurality of cylindrical rods 123 at a desired elevation inside a cylindrical casing 20. In an activated state 340, a plurality of disc assemblies 175 (previously described in association with FIG. 8) are fully extended by mechanical engagement of a hollow core packtivator sub 302 such that the formed rubber material 185 that encases a large packer assembly 100 is firmly pressed against an interior wall of a casing 20 such that an annular space 29 previously shown in FIG. 21 is filled to prevent flow of a fluid (not shown). A small packer assembly 200 in a retracted or non-activated state 230 is shown at the top of a hollow core packtivator sub 301 beneath a hollow core packtivator stem in FIG. 22.

Figure 23:
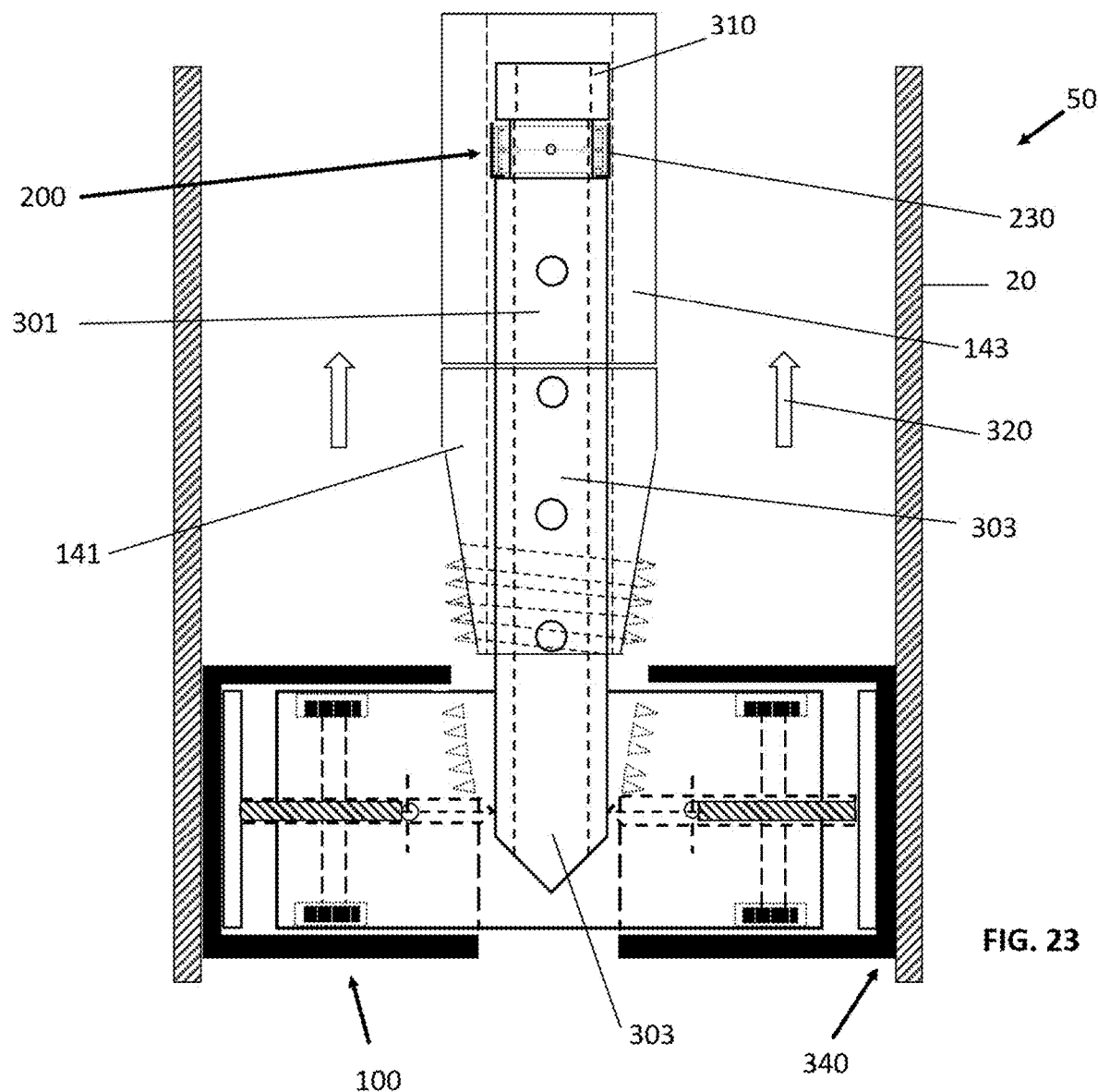
FIG. 23 is a sectional view of an example application of a large packer assembly in an activated state inside a casing and removal of a packer stem assembly while a small packer assembly remains in an inactivated state.

FIG. 23 shows a sectional view of an example application 50 of a large packer assembly 100 in an activated state 340 inside a cylindrical casing 20. In an activated state 340, a plurality of disc assemblies 175 (previously described in association with FIG. 8) are fully extended by mechanical engagement of a hollow core packtivator sub 302 such that the formed rubber material 185 that encases a large packer assembly 100 is firmly pressed against an interior wall of a casing 20 such that an annular space 29 previously shown in FIG. 21 is filled to prevent flow of a fluid (not shown). A hollow core packtivator sub 301 remains in place at a desired elevation as a hollow core packer stem 143 and hollow core packer sub 141 are removed from the cylindrical casing 20 shown by arrows 320. A small packer assembly 200 in a retracted or non-activated state 230 is shown at the top of a hollow core packtivator sub 301 and beneath a hollow core packtivator stem 310 in FIG. 23.

Figure 24A:
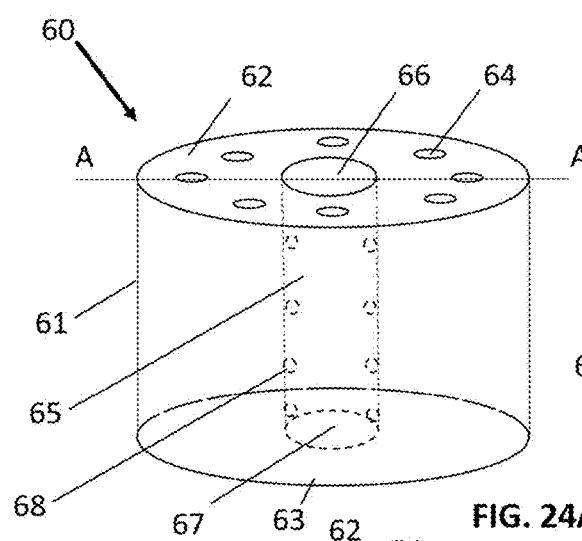
FIG. 24A is an isometric view of one embodiment of an fluid treatment cartridge and FIG. 24B is a sectional view of the first embodiment showing a treatment media inside.

FIG. 24A is an isometric view of a cylindrically shaped fluid treatment cartridge 60 that in one embodiment consists of sidewalls 61, a top 62, and a bottom 63. A plurality of holes 64 are shown in a top 62 and an open cylindrical tube 65 is on the inside of a cartridge 60 exposing a hole 66 in a top 62 and a hole 67 in a bottom 63 of a cartridge 60. A plurality of perforations 68 are shown on walls of a cylindrical tube 65. A section line A-A' is labeled in FIG. 24A and the corresponding cross-sectional view along the center of cylindrically shaped fluid treatment cartridge 60 is shown in FIG. 24B.

Figure 24B:
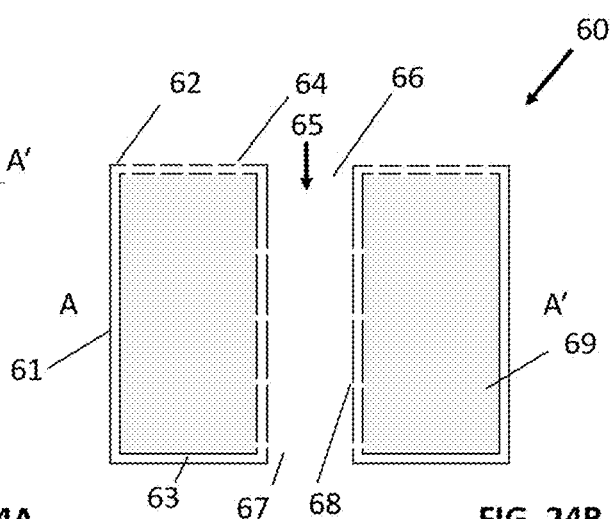

A permeable and reactive treatment media 69 is shown inside a fluid treatment cartridge 60 in FIG. 24B (the media is not specified within the present disclosure as the selection of appropriate media and its particle size would be site specific depending on the contaminants in a fluid requiring treatment, but could include, as one example, activated carbon). External sidewalls 61, a top 62, and a bottom 63 are shown. A plurality of holes 64 are shown in a top 62 and a hole 66 of an open cylindrical tube 65 is on the inside of a cartridge 60 exposing a hole 66 in a top 62 and a hole 67 in a bottom 63 of a cartridge 60. A plurality of perforations 68 are shown on walls of a cylindrical tube 60 in FIG. 24B.

Figure 24C:
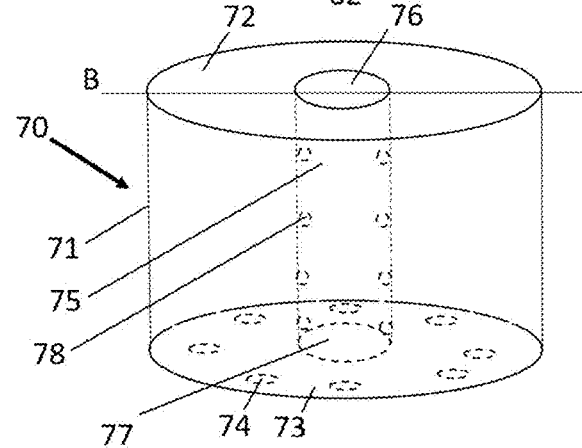
FIG. 24C is an isometric view of a second embodiment of an fluid treatment cartridge and FIG. 24D is a sectional view of the second embodiment showing a treatment media inside.

FIG. 24C is an isometric view of a cylindrically shaped fluid treatment cartridge 70 that in one embodiment consists of sidewalls 71, a top 72, and a bottom 73 that is perforated with a plurality of holes 74. An open cylindrical tube 75 is on the inside of a cartridge 70 exposing a hole 76 in a top 72 and a hole 77 in a bottom 73 of a cartridge 70. A plurality of perforations 78 are shown on walls of a cylindrical tube 75. A section line B-B' is labeled in FIG. 24C and the corresponding cross-sectional view along the center of cylindrically shaped fluid treatment cartridge 70 is shown in FIG. 24D.

Figure 24D:
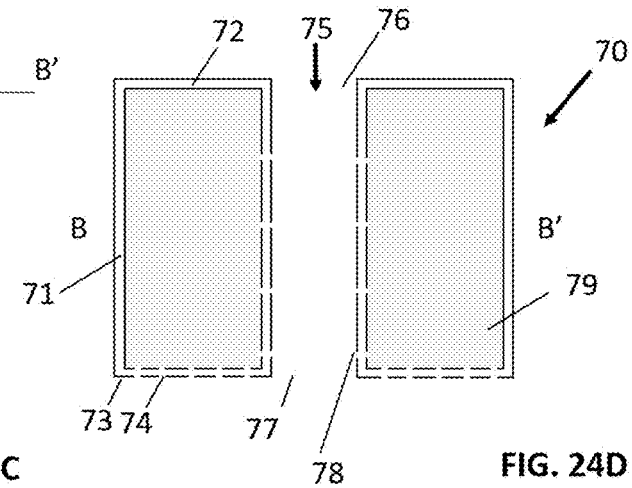

A permeable and reactive treatment media 79 is shown inside a cartridge 70 in FIG. 24D (the media is not specified within the present disclosure as the selection of appropriate media and its particle size would be site specific depending on the contaminants in a fluid requiring treatment, but could include, as one example, activated carbon). External sidewalls 71, a top 72, and a bottom 73 with a plurality of holes 74 are shown. An open cylindrical tube 75 on the inside of a cartridge 60 exposes a hole 76 in a top 72 and a hole 77 in a bottom 73 of a cartridge 70. A plurality of perforations 78 are shown on walls of a cylindrical tube 70 in FIG. 24B.

FIG. 25A is an isometric view of a cylindrically shaped fluid treatment cartridge 80 that in one embodiment consists of sidewalls 81, a top 82, and a bottom 83 that is perforated with a plurality of holes 84. A hole 85 is shown in a top 82. A section line C-C' is labeled in FIG. 25A and the corresponding cross-sectional view along the center of cylindrically shaped fluid treatment cartridge 80 is shown in FIG. 25B.

A permeable and reactive treatment media 89 is shown inside a cartridge 80 in FIG. 25B (the media is not specified within the present disclosure as the selection of appropriate media and its particle size would be site specific depending on the contaminants in a fluid requiring treatment, but could include, as one example, activated carbon). External sidewalls 81, a top 82, and a bottom 83 with a plurality of holes 84 are shown. A hole 85 is shown in a top 82 in FIG. 25B.

FIG. 25C is an isometric view of a cylindrically shaped fluid treatment cartridge 90 that in one embodiment consists of sidewalls 91, a top 92, and a bottom 93. A plurality of holes 94 are in a top 92 and a hole 95 is shown in a bottom 93. A section line D-D' is labeled in FIG. 25C and the corresponding cross-sectional view along the center of cylindrically shaped fluid treatment cartridge 90 is shown in FIG. 25D.

A permeable and reactive treatment media 99 is shown inside a cartridge 90 in FIG. 25D (the media is not specified within the present disclosure as the selection of appropriate media and its particle size would be site specific depending on the contaminants in a fluid requiring treatment, but could include, as one example, activated carbon). External sidewalls 91, a top 92 with a plurality of holes 94, and a bottom 93 with a hole 95 are shown in FIG. 25D.

Figure 26:
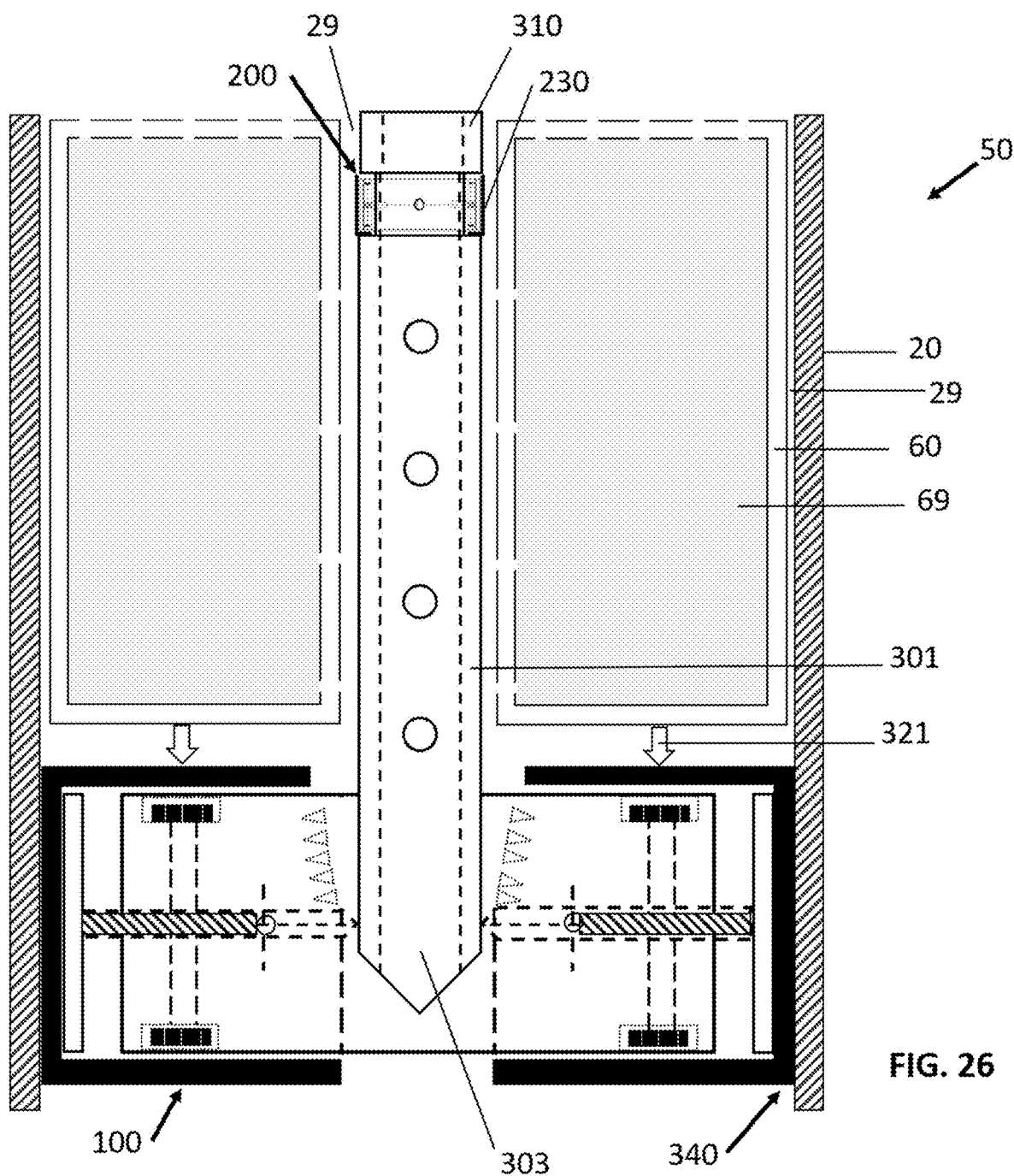
FIG. 26 is a sectional view of an example application of a large packer assembly in an activated state inside a casing and lowering of an fluid treatment cartridge over a packtivator while a small packer assembly remains in an inactivated state.

FIG. 26 shows a sectional view of an example application 50 of a large packer assembly 100 in an activated state 340 inside a cylindrical casing 20 In an activated state 340, previously described disc assemblies 175 are fully extended radially by mechanically wedged engagement of a hollow core 303 packtivator sub 301 and a formed rubber material 185 encasing a large packer assembly 100 is firmly pressed against an interior wall of a casing 20 such that an annular space 29 previously shown in FIG. 21 is filled to prevent flow of a fluid (not shown). A hollow core packtivator sub 301 with a hollow core packtivator stem 310 remain in place at a desired elevation as a fluid treatment cartridge 60 with a media 69 inside is lowered as shown by arrows 321 to be seated on top of a large packer assembly 100. An underlying spacer may be providing support to the large packer assembly in casing 20 but is not shown.

A small packer assembly 200 in a retracted or non-activated state 230 is shown at the top of the hollow core packtivator sub 301 in FIG. 26. An annular space 29 is shown between the interior wall of a casing 20 and exterior wall of a cartridge 60. Another annular space 29 is shown above a small packer assembly 200 between a hollow core packtivator stem 310 and a perforated 68 cylindrical tube 65 (previously detailed in FIG. 24A and FIG. 24B) inside a fluid treatment cartridge 60.

Figure 27:
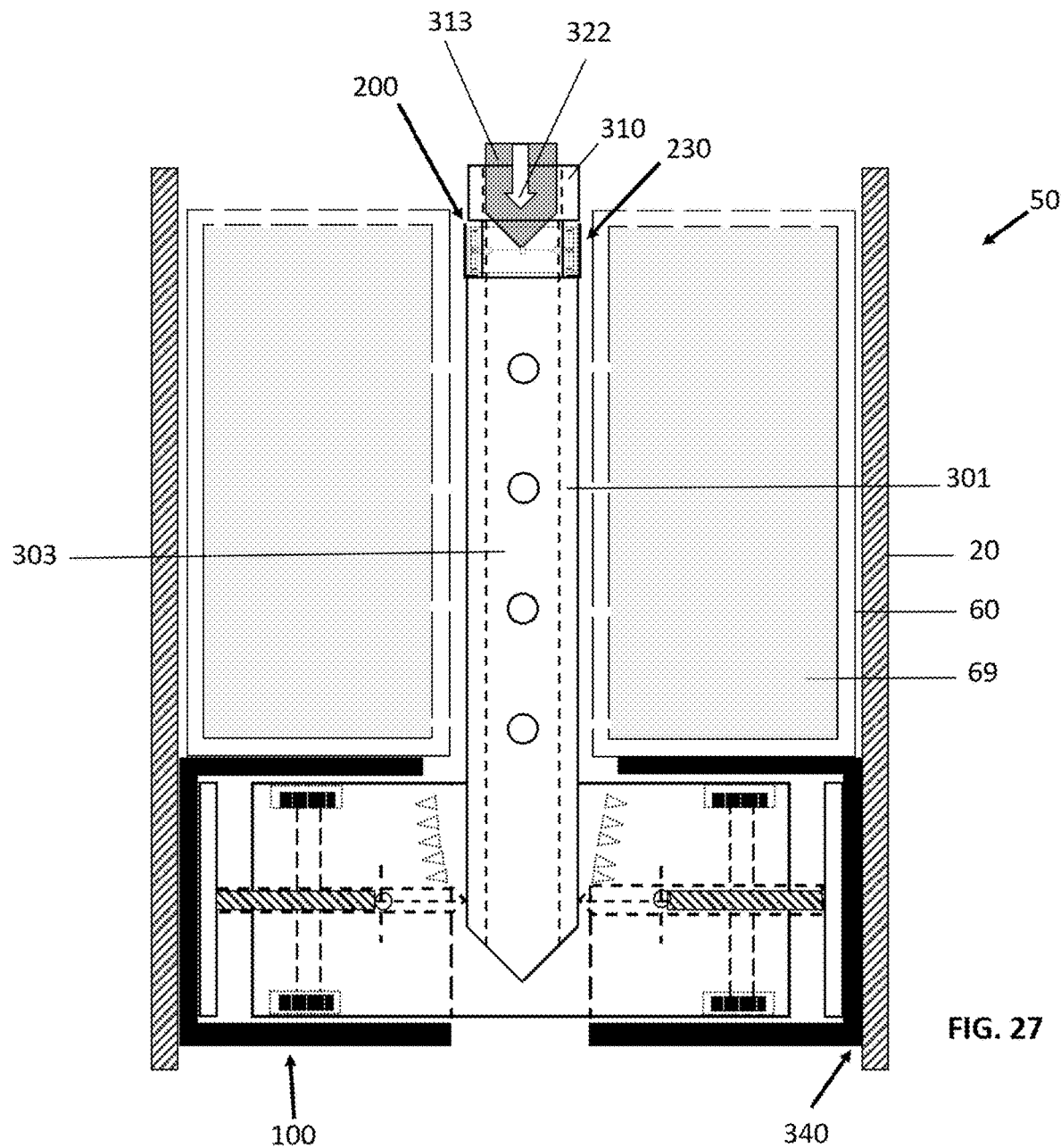
FIG. 27 is a sectional view of an example application of a large packer assembly in an activated state inside a casing with an fluid treatment cartridge seated on top. A small packtivator is being lowered into a larger diameter packtivator while a small packer assembly remains in an inactivated state.

FIG. 27 shows a sectional view of an example application 50 of a large packer assembly 100 in an activated state 340 inside a cylindrical casing 20 at a desired elevation. A fluid treatment cartridge 60 is seated on top of a large packer assembly 100 in an activated state 314. A media 69 is shown inside a cartridge 60. A solid core packtivator sub 313 with a small diameter is shown being lowered by a downward vertical arrow 322 into a hollow portion 303 of a larger diameter hollow core packtivator sub 301 near a small packer assembly 200 in a retracted or non-activated state 230 at the top of FIG. 27.

Figure 28:
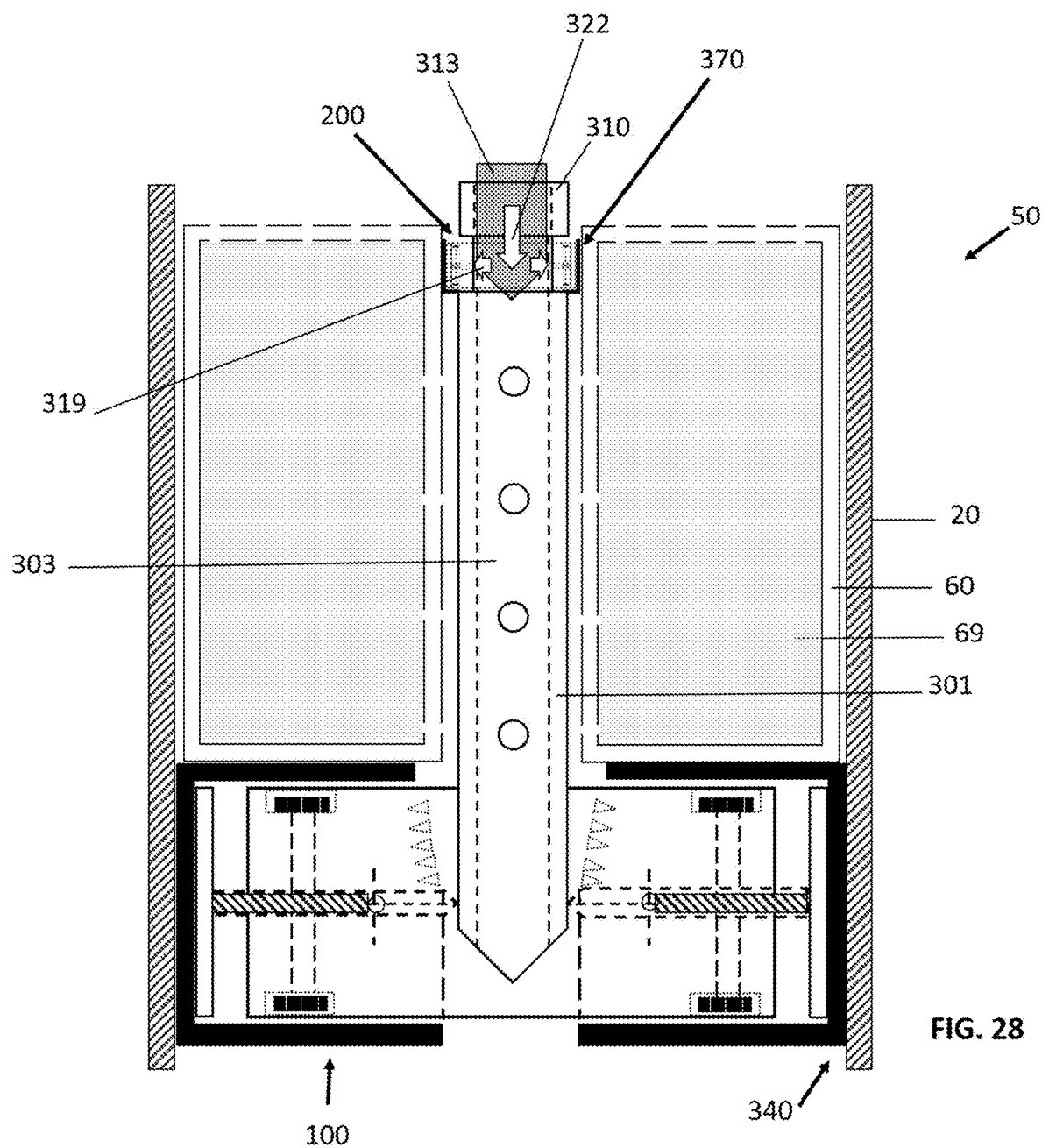
FIG. 28 is a sectional view of an example application of a large packer assembly in an activated state inside a casing with a fluid treatment cartridge seated on top. A small packer assembly has been activated by a small solid core packtivator.

FIG. 28 shows a sectional view of an example application 50 of a large packer assembly 100 in an activated state 340 inside a cylindrical casing 20 at a desired elevation. A fluid treatment cartridge 60 with a media 69 on the inside is seated on top of a large packer assembly 100 in an activated state 340. A solid core packtivator sub 313 with a small diameter is shown by a downward vertical arrow 322 exerting a lateral force shown by arrows 319 that activate 370 a small packer assembly 200 at the top of a larger diameter hollow core packtivator sub 301. The small packer assembly 200 is in contact with the interior walls of a cylinder 65 (previously shown in FIG. 24A) inside of a fluid treatment cartridge 60 thereby sealing an upper annular space 29 previously shown in FIG. 26.

Figure 29:
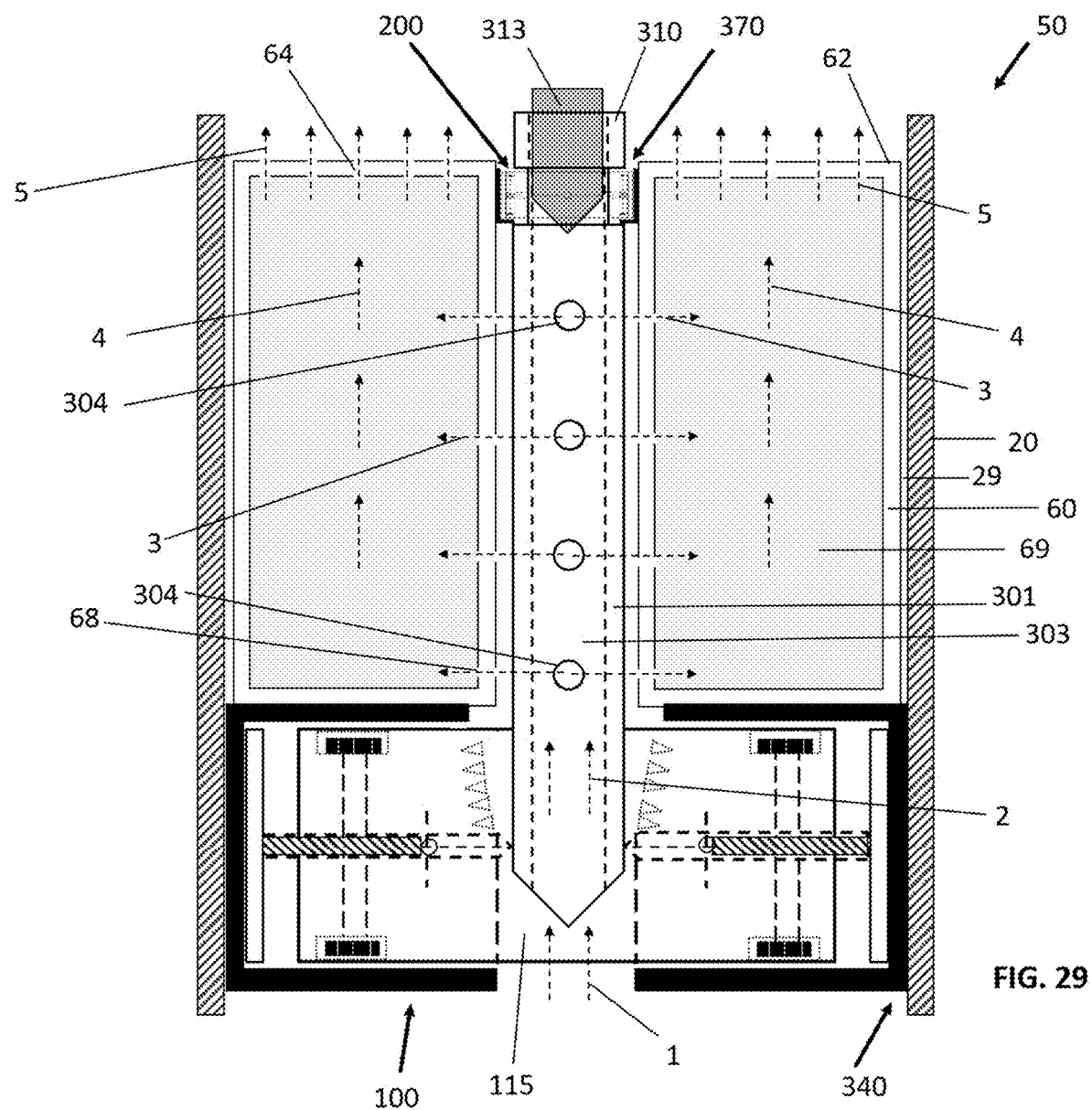
FIG. 29 is a side elevation view of an example application of a large and a small mechanical packer assembly in a casing that have been activated by hollow core and solid core packtivators, respectively, to control the flow of a fluid and direct the fluid through an in-situ treatment cartridge.

FIG. 29 shows a sectional view of an example application 50 of a large packer assembly 100 in an activated state 340 inside a cylindrical casing 20 at a desired elevation. A fluid treatment cartridge 60 with a media 69 on the inside is seated on top of a large packer assembly 100 in an activated state 340. A solid core packtivator sub 313 with a small diameter remains at a set elevation to activate 370 a small packer assembly 200 at the top of a larger diameter hollow core 303 packtivator sub 301. The small packer assembly 200 is in contact with the interior walls of a cylinder 65 (previously shown in FIG. 24A) inside of a fluid treatment cartridge 60 thereby sealing an upper annular space 29 previously shown in FIG. 26.

Packer assemblies 100 and 200 shown in FIG. 29 are activated 340 and 370, respectively, thereby controlling the flow direction of a fluid as indicated by dashed arrows 1 through 5. The dashed arrows reference different points along an upward fluid flow path (i.e., a fluid is generally flowing from points 1 to 5 in this example, which are referred to herein as flow arrows intended to illustrate a general direction of fluid flow).

Specifically, in the example 50 shown in FIG. 29, a fluid enters a lower elevation of a casing 20 and flows upward into a hole 115 in the bottom of a large packer assembly 100 shown by parallel flow arrows 1. A fluid flows upward in a hollow core 303 of a packtivator sub 301 shown by parallel flow arrows 2 and then flows laterally out a plurality of holes 304 of a hollow core packtivator sub 301 shown by parallel flow arrows 3 into a treatment media 69 inside a fluid treatment cartridge 60. A fluid flows upward through a treatment media 69 inside a fluid treatment cartridge 60 as shown by parallel flow arrows 4. A fluid exits a cartridge 60 as shown by parallel flow arrows 5 through a plurality of holes 64 shown in a top 62 of a cartridge 60.

In the example 50 shown in FIG. 29, the upward flow of a fluid is controlled by two packer assemblies (100 and 200) both in activated states 340 and 370, respectively. Previously described disc assemblies 175 and 275 for packer assemblies 100 and 200, respectively, are fully extended by mechanical means. Packtivators 301 and 313 mechanically engage with the large packer assembly 100 and the small packer assembly 200, respectively. Formed rubber materials 185 and 285 encasing the packer assemblies 100 and 200, respectively, are firmly pressed against interior walls of casings from the mechanical operation of the packers such that previously described annular spaces 29 are sealed thereby controlling fluid flow and directing it instead along a desired flow path. Specifically, in the example 50 shown in FIG. 29, the fluid entering a lower elevation of casing 20 is considered to be contaminated and is purposely directed through a cartridge for increased contact and residence time with a media 69 for treatment before discharging (not shown) from a casing 20.

FIG. 30 is a side elevation view of an example application of a mechanical packer system 400 showing a sequence of installation steps that could be followed in operation.

Figure 30A:
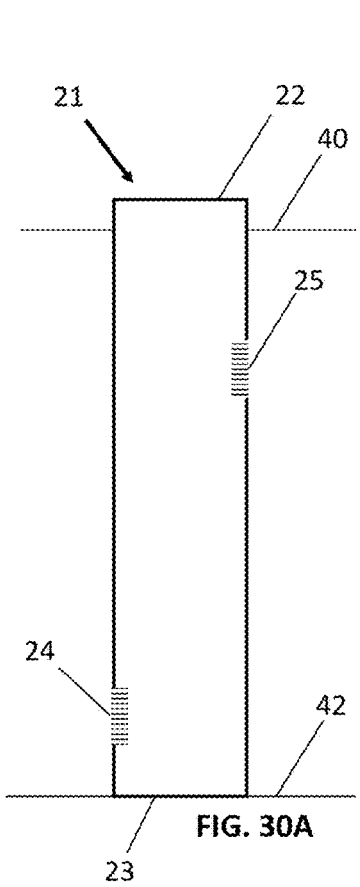
FIG. 30A shows a casing installed below a ground surface.

FIG. 30A shows a cylindrical casing 21 with a top 22, bottom 23, a lower elevation well screen 24 on one side of a casing 21, and an upper elevation screen 25 on an opposing side of a casing 21. A casing 21 is installed below a ground surface 40 where an open bottom 23 is seated into a layer 42 at a lower elevation than a ground surface 40. In other applications (not shown), a casing bottom may be closed or have a drive shoe.

Figure 30B:
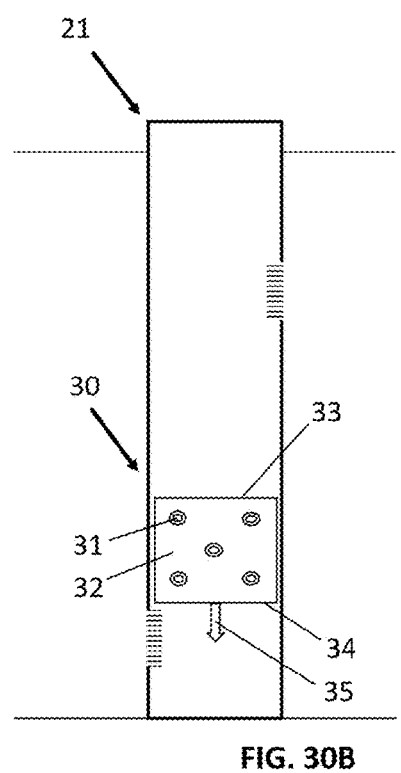
FIG. 30B shows the addition of a permeable spacer.

FIG. 30B shows a removable permeable spacer 30 being lowered into a casing 21 previously described in FIG. 30A as shown by a downward arrow 35. In one embodiment a spacer has perforations 31 in cylindrical walls 32. Perforations (not shown) are also in a top 33 and a bottom 34 in this embodiment of a removable permeable spacer 30. In other applications (not shown), a spacer may be as simple as a permeable aggregate added to the bottom of a casing.

Figure 30C:
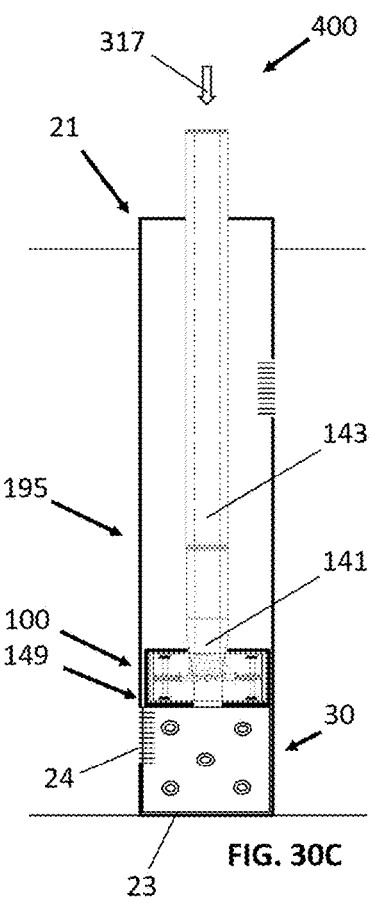
FIG. 30C shows the installation of a large packer assembly.

FIG. 30C shows a removable permeable spacer 30 in position at a desired elevation in the bottom 23 of a casing 21 aligning with a lower elevation well screen 24. A large packer assembly 100 in a retracted or non-activated state 149 is set on top of a removable permeable spacer 30 by a hollow core packer sub 141 connected to a hollow core packer stem 143 constituting a hollow core packer stem assembly 195 being lowered into a casing 21 as shown by a downward arrow 317.

FIG. 31 is a side elevation view of an example application of a mechanical packer system 400 showing a sequence of installation steps that could be followed in operation and represents a continuation of the installation steps shown in FIG. 30A through FIG. 30C.

FIG. 31A shows a hollow core packer stem assembly 195 remaining connected to a large packer assembly 100 which is in a retracted or non-activated state 149 and seated on top of a removable permeable spacer 30 in a casing 21 installed below a ground surface 40. A hollow core packtivator sub 301 is partially inserted into a hollow core packer stem 143 as shown by a downward arrow 318.

FIG. 31B shows a hollow core packtivator sub 301 that has been further inserted into a hollow core packer sub 141 such that the beveled end 302 of the packtivator sub 301 has engaged with the beveled ends 135 of the cylindrical rods 123 (previously detailed in FIG. 22) inside a large packer assembly 100. A large packer assembly 100 is placed in an activated state 340 as shown by horizontal arrows 319 indicating a lateral force. A hollow core packtivator sub 301 and hollow core packtivator stem 310 remain in place while a hollow core stem assembly 195 is in the process of being removed from a casing 21 (by unscrewing threads 142 on the hollow sub 141 from threads 118 in an upper plate 101 of a large packer assembly 100 as previously shown in FIG. 12). A hollow core stem assembly 195 is shown to be removed from a casing 21 by an upward arrow 320.

FIG. 31C shows a fluid treatment cartridge 60 filled with a treatment media 69 lowered into a casing 21 as indicated by downward arrows 321. A cartridge 60 is seated upon a previously described large packer assembly 100 which is in an activated state 340 and is supported by an underlying permeable spacer 30. As previously discussed, and shown in FIG. 24A and FIG. 24B, an open cylinder 65 inside a fluid treatment cartridge 60 allows it to be installed over a hollow core packtivator stem 310 and hollow core packtivator sub 301 without interference.

FIG. 32 is a side elevation view of an example application of a mechanical packer system 400 showing a sequence of installation steps that could be followed in operation and represents a continuation of the installation steps shown in FIG. 31A through FIG. 31C.

Figure 32A:
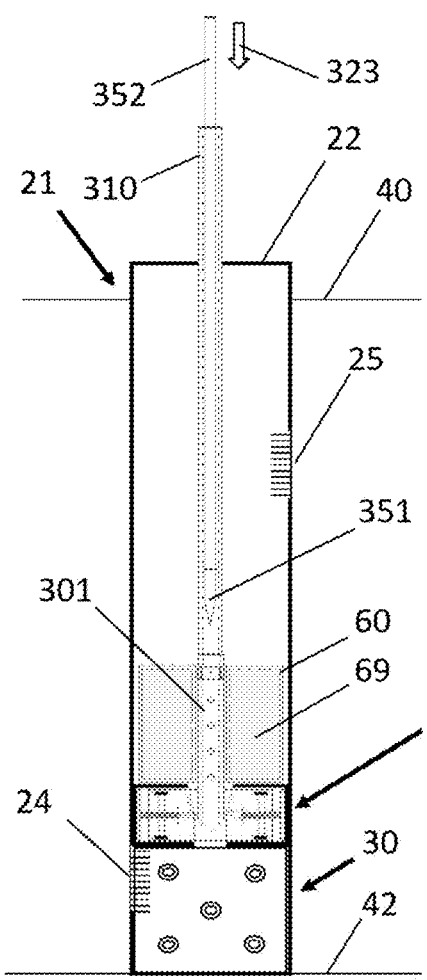
FIG. 32A shows a small diameter hollow core packtivator sub and stem partially lowered inside a large diameter hollow core packtivator stem.

FIG. 32A shows a small diameter hollow core packtivator sub 351 with an attached small diameter hollow core packtivator stem 352 partially lowered inside a large diameter hollow core packtivator stem 310 as indicated by a downward arrow 323.

Figure 32B:
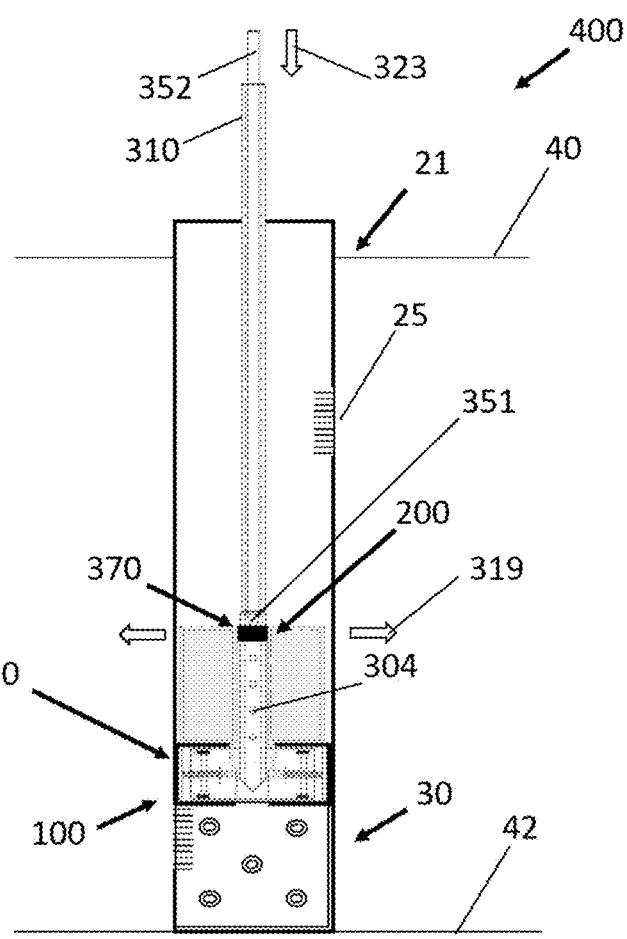
FIG. 32B shows activation of a small packer assembly in the top of an fluid treatment cartridge on an activated large packer assembly resting upon a permeable spacer at the bottom of a casing.

FIG. 32B shows further lowering of a small diameter hollow core packtivator stem 352 shown by a downward arrow 323 such that a beveled end 302 of a hollow core packtivator sub 351 has engaged with beveled ends 135 of cylindrical rods 123 (previously detailed in FIG. 22) inside a small packer assembly 200 placing the small packer assembly 200 in an expanded or activated state 370 shown by horizontal arrows 319 indicating that a lateral force was applied by the hollow core packtivator sub 351.

Figure 33:
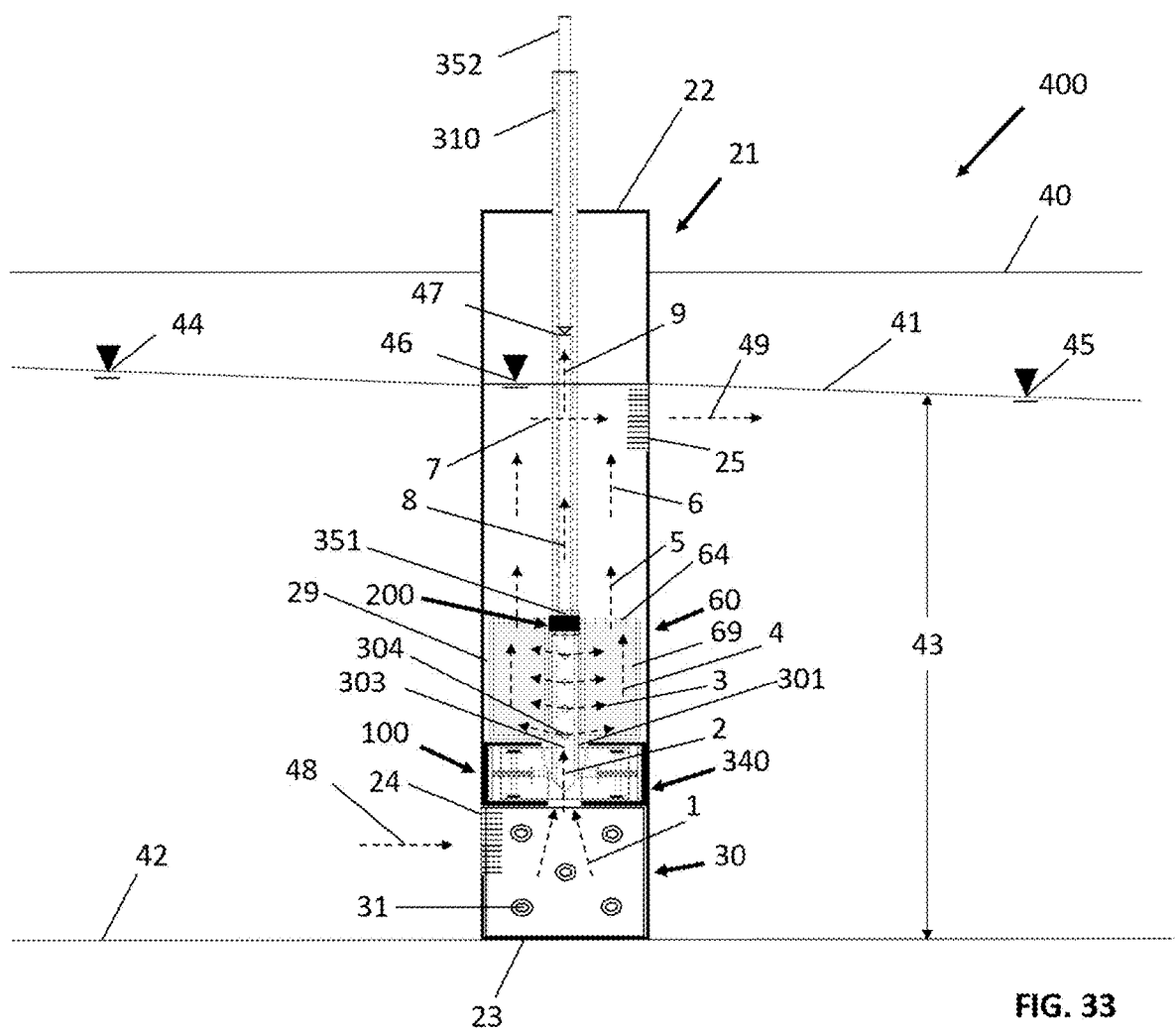
FIG. 33 is a side elevation view of an example application two activated mechanical packer systems that incorporates the eight installation steps previously detailed in FIG. 30A through FIG. 32B detailing the packer's control of upward fluid flow inside a casing in an example groundwater setting.

FIG. 33 is a side elevation view of an example application 400 of a mechanical packer system that incorporates the installation steps previously detailed in FIG. 30A through FIG. 32B showing two mechanical packer systems 100 and 200 both in activated states 340 and 370, respectively, detailing the control of example packer systems on a fluid in an example application 400. The fluid in application 400 could be groundwater, for example, although other fluids such as oil or gas could be envisioned. A cylindrical casing 21 with a top 22, bottom 23, a lower elevation well screen 24 on one side of a casing 21, and an upper elevation screen 25 on an opposing side of a casing 21 is shown installed below a ground surface 40 where an open bottom 23 is seated into a layer 42 at a lower elevation than a ground surface 40 which could represent a lower-permeability layer 42 beneath an aquifer 43 defined as a zone of saturation between a water table 41 and a lower-permeability layer (or aquitard) 42 wherein water at a higher elevation 44 than at a lower elevation 45 creates a flow regime from left to right in FIG. 33.

In the example application 400 shown in FIG. 33, a casing 21 serves the same purpose as a filter casing or filter channel described in detail in U.S. Pat. Nos. 9,937,537 B2 and 10,556,260 B2, in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either an upward or downward flow direction according to its installation and site-specific arrangement.

An impervious barrier wall, although not shown in FIG. 33, is detachably secured to both sides of a casing 21 (perpendicular to the illustration) with a purpose of diverting groundwater to flow preferentially toward a casing 21. In the example application 400 shown in FIG. 33, groundwater, as an example, flows laterally 48 into a lower elevation inlet screen 24 and moves generally upward through a casing 21 before discharging laterally 49 through a higher elevation outlet screen 25 (due to differences in hydraulic head resulting from the connection of a casing 21 to a barrier wall, not shown).

Specifically, in the example 400 shown in FIG. 33, contaminated groundwater, as an example, laterally enters a casing 21 through a lower elevation inlet screen 24 and flows upward in a permeable spacer 30 to the center of a large packer assembly 100 shown by converging flow arrows 1. Groundwater flows upward in a hollow core 303 of a hollow core packtivator sub 301 shown by flow arrow 2 and then flows laterally out a plurality of holes 304 of a hollow core packtivator sub 301 shown by parallel flow arrows 3 into a treatment media 69 inside an fluid treatment cartridge 60. Groundwater flows upward through a treatment media 69 inside a fluid treatment cartridge 60 as shown by parallel flow arrows 4 before exiting a plurality of holes 64 in a top of a cartridge 60. Groundwater continues to flow upward in a casing 21 shown by parallel flow arrows 6 before flowing horizontally as shown by flow arrow 7 before discharging 49 through a higher elevation outlet screen 25.

Since a small diameter packtivator sub 351 in this example 400 is hollow, fluids will also flow upward into a hollow core packtivator sub 351 and into a small diameter hollow core packtivator stem 352 as shown by flow arrows 8 and 9 in FIG. 33. Groundwater in a small diameter hollow core packtivator stem 352 is shown to be at a higher elevation 47 than a groundwater elevation inside a larger diameter casing 21 in FIG. 33. Groundwater inside a small diameter hollow core packtivator stem 352 represents untreated groundwater that has entered at a lower elevation of a casing 21 under a higher hydraulic head than treated groundwater that has discharged from the in-situ treatment cartridge 60 shown by parallel flow arrows 5 and is a lower hydraulic head 46 in a casing 21. In this example 400, a small diameter hollow core packtivator stem 352 could be used as a piezometer specifically to measure hydraulic head and/or a pre-treatment groundwater quality monitoring well inside a casing 21.

A small diameter hollow core packtivator sub 351 that has activated a small mechanical packer assembly 200 at an upper elevation of casing 21 prevents fluid from bypassing treatment inside an fluid treatment cartridge 60, and instead, groundwater has been laterally dispersed as shown by parallel flow arrows 3 into a cartridge 60 for increased residence time and contact with a treatment media 69 as well as with an upward component as shown by parallel flow arrows 4. In this example application 400, contaminated groundwater that entered a packer assembly 100 at a lower elevation of a casing 21 shown by flow arrows 1 has undergone treatment with media 69 within a cartridge 60 before flowing out the top of a cartridge 60 shown by flow parallel arrows 5 at a higher elevation.

Figure 34:
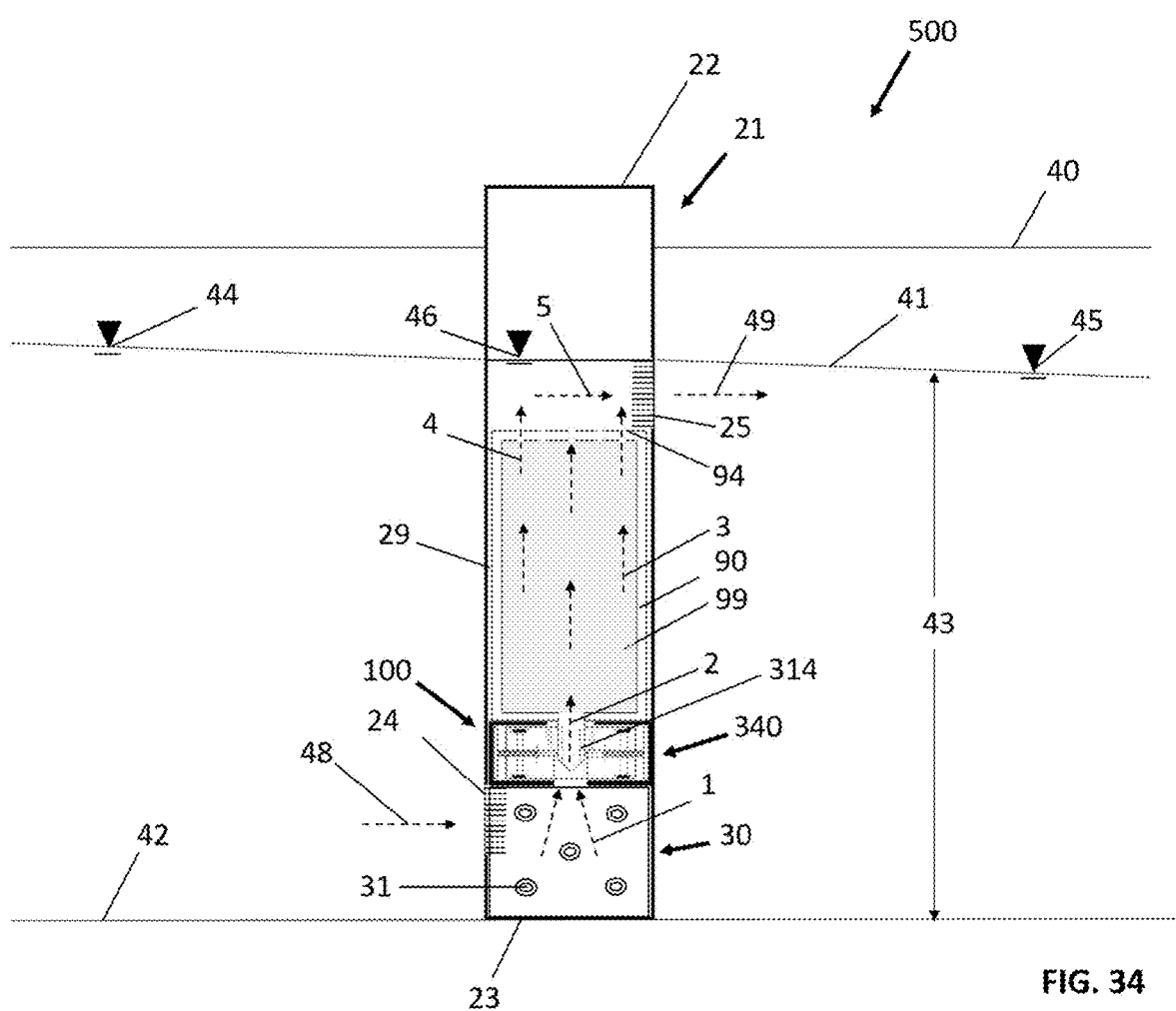
FIG. 34 is a side elevation view of an example application of a single activated mechanical packer system detailing the packer's control of upward fluid flow inside a casing in an example groundwater setting.

FIG. 34 is a side elevation view of an example application 500 of a mechanical packer system showing a single large mechanical packer system 100 in an activated state 340 detailing the control of example packer system on a fluid. The fluid in application 500 could be groundwater, for example, although other fluids such as oil or gas could be envisioned. A cylindrical casing 21 with a top 22, bottom 23, a lower elevation well screen 24 on one side of a casing 21, and an upper elevation screen 25 on an opposing side of a casing 21 is shown installed below a ground surface 40 where an open bottom 23 is seated into a layer 42 at a lower elevation than a ground surface 40 which could represent a lower-permeability layer 42 beneath an aquifer 43 defined as a zone of saturation between a water table 41 and a lower-permeability layer (or aquitard) 42 wherein water at a higher elevation 44 than at a lower elevation 45 creates a flow regime from left to right in FIG. 34.

In the example application 500 shown in FIG. 34, a casing 21 serves the same purpose as a filter casing or filter channel described in detail in U.S. Pat. Nos. 9,937,537 B2 and 10,556,260 B2, in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either an upward or downward flow direction according to its installation and site-specific arrangement.

An impervious barrier wall, although not shown in FIG. 34, is detachably secured to both sides of a casing 21 (perpendicular to the illustration) with a purpose of diverting groundwater to flow preferentially toward a casing 21. In the example application 500 shown in FIG. 34, groundwater, as an example, flows laterally 48 into a lower elevation inlet screen 24 and moves generally upward through a casing 21 before discharging laterally 49 through a higher elevation outlet screen 25 (due to differences in hydraulic head resulting from the connection of a casing 21 to a barrier wall, not shown).

Specifically, in the example 500 shown in FIG. 34, contaminated groundwater, as an example, laterally enters 48 a casing 21 through a lower elevation inlet screen 24 and flows upward in a permeable spacer 30 to the center of a large packer assembly 100 shown by converging flow arrows 1. Groundwater flows upward in a hollow core 303 of a packtivator sub 314 shown by flow arrow 2 directly into a bottom hole in a fluid treatment cartridge 90 (previously detailed in FIG. 25C and FIG. 25D). Groundwater flows upward through a treatment media 99 inside a fluid treatment cartridge 90 as shown by parallel flow arrows 3 before exiting a plurality of holes 94 in a top of a cartridge 90 shown by parallel flow arrows 4. Groundwater flows horizontally as shown by flow arrow 5 before laterally discharging 49 through the higher elevation outlet screen 25.

In the example application 500 shown in FIG. 34 contaminated groundwater that laterally entered 48 a lower elevation of a casing 21 has undergone treatment by increased residence time and contact with a treatment media 99 and laterally discharges 49 from an higher elevation outlet screen 25 as treated groundwater.

Figure 35:
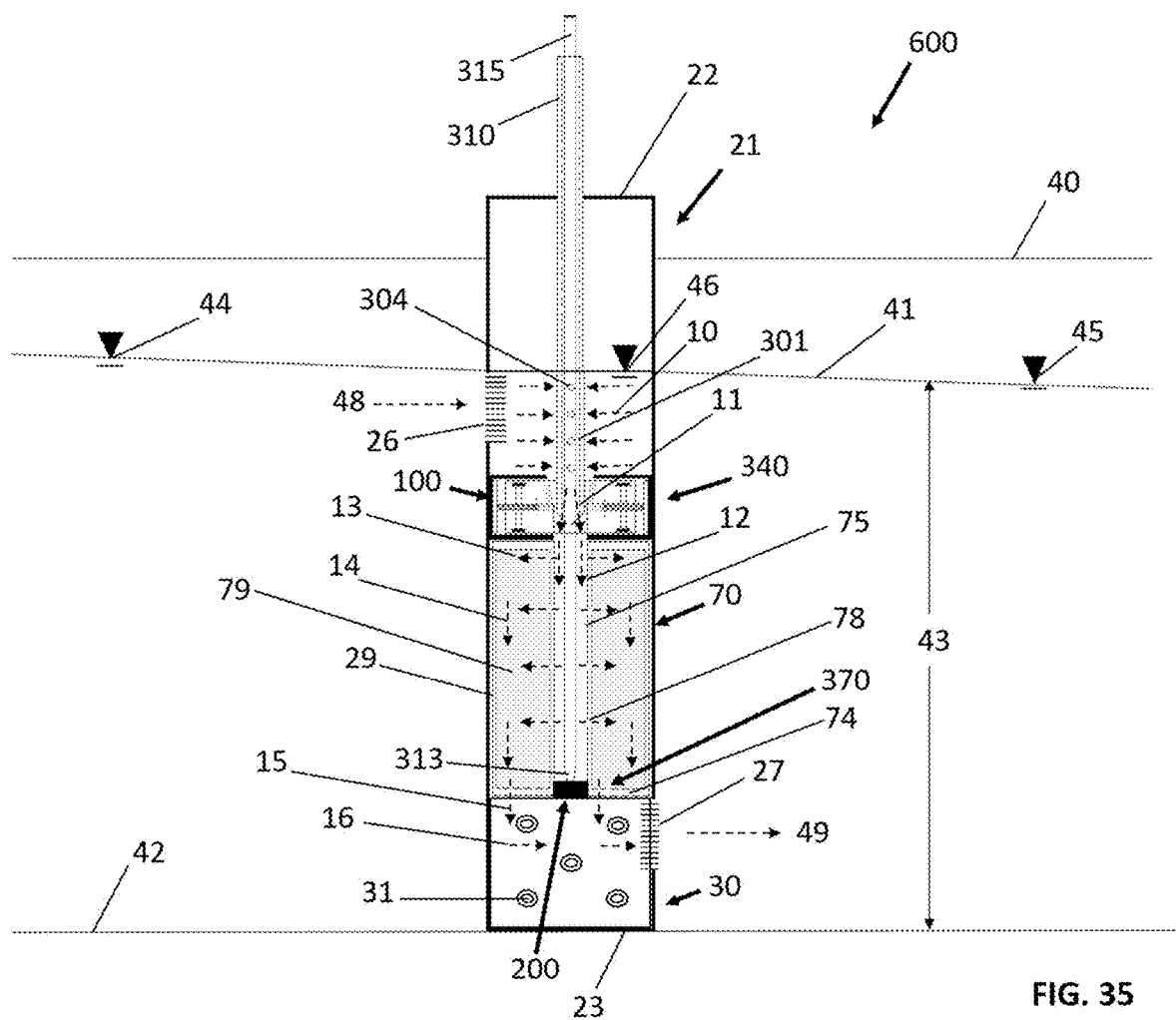
FIG. 35 is a side elevation view of an example application of a two activated mechanical packer system detailing the packer's control of downward fluid flow inside a casing in an example groundwater setting.

FIG. 35 is a side elevation view of an example application 600 of a mechanical packer system showing two mechanical packer systems 100 and 200 both in activated states 340 and 370, respectively, detailing the control of example packer systems on a fluid in an example application 600. The fluid in application 600 could be groundwater, for example, although other fluids such as oil or gas could be envisioned. A cylindrical casing 21 with a top 22, bottom 23, a higher elevation well screen 26 on one side of a casing 21, and an lower elevation screen 27 on an opposing side of a casing 21 is shown installed below a ground surface 40 where an open bottom 23 is seated into a layer 42 at a lower elevation than a ground surface 40 which could represent a lower-permeability layer 42 beneath an aquifer 43 defined as a zone of saturation between a water table 41 and a lower-permeability layer (or aquitard) 42 wherein water at a higher elevation 44 than at a lower elevation 45 creates a flow regime from left to right in FIG. 35.

In the example application 600 shown in FIG. 35, a casing 21 serves the same purpose as a filter casing or filter channel described in detail in U.S. Pat. Nos. 9,937,537 B2 and 10,556,260 B2, in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either upward or downward flow direction according to its installation and site-specific arrangement.

An impervious barrier wall, although not shown in FIG. 35, is detachably secured to both sides of a casing 21 (perpendicular to the illustration) with a purpose of diverting groundwater to flow preferentially toward a casing 21. In the example application 600 shown in FIG. 35, groundwater flows laterally 48 into a higher elevation inlet screen 26 and moves generally downward through a casing 21 before laterally discharging 49 through a lower elevation outlet screen 27 (due to differences in hydraulic head resulting from the connection of a casing 21 to a barrier wall, not shown).

Specifically, in the example 600 shown in FIG. 35, groundwater laterally enters 48 a casing 21 through a higher elevation inlet screen 26 and flows laterally shown by parallel flow arrows 10 into a plurality of holes 304 of a hollow core packtivator sub 301 used to activate 340 a large packer assembly 100 near an upper elevation in a casing 21. A smaller diameter solid core packtivator stem 362 and a solid core packtivator sub 361 are shown inside a hollow core packtivator sub 301 and hollow core packtivator stem 310 used to activate 370 a small mechanical packer system 200 near a lower elevation in a casing 21 and prevent fluids from bypassing treatment inside a cartridge 70 and instead increasing residence time and contact with a treatment media 79. Groundwater flows downward through the hollow core packtivator sub 301 as shown by diverging flow arrows 11.

A fluid treatment cartridge 70 and treatment media 79 (previously detailed in FIG. 24C and FIG. 24D) are shown below a large packer assembly 100 in FIG. 35. Groundwater flows downward through an internal cylinder 75 in a fluid treatment cartridge 70 as shown by flow arrows 12 and laterally out through a plurality of holes 78 in an internal cylinder 75 into treatment media 79 as shown by flow arrows 13. Groundwater flows vertically downward through the treatment media 79 as shown by parallel flow arrows 14 and continues to flow vertically downward exiting a plurality of holes 74 in a bottom of a cartridge 70 shown by parallel flow arrows 15 and laterally within a permeable spacer 30 shown by flow arrows 16 before discharging laterally 49 through a lower elevation outlet screen 27.

Figure 36:
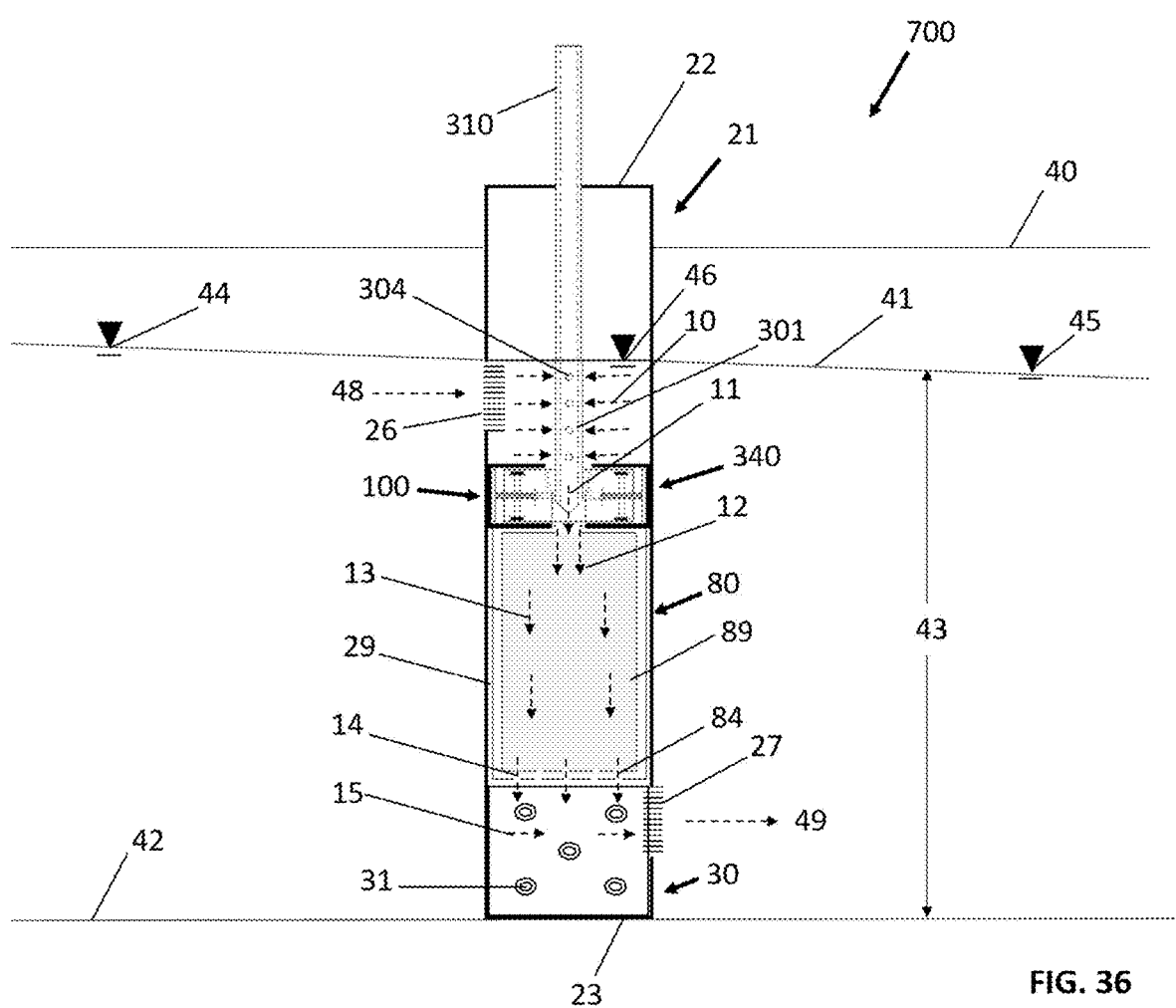
FIG. 36 is a side elevation view of an example application of a single activated mechanical packer system detailing the packer's control of downward fluid flow inside a casing in an example groundwater setting.

FIG. 36 is a side elevation view of an example application 700 of a mechanical packer system 100 in an activated state 340 detailing the control of example packer system on a fluid in an example application 700. The fluid in application 700 could be groundwater, for example, although other fluids such as oil or gas could be envisioned. A cylindrical casing 21 with a top 22, bottom 23, a higher elevation well screen 26 on one side of a casing 21, and an lower elevation screen 27 on an opposing side of a casing 21 is shown installed below a ground surface 40 where an open bottom 23 is seated into a layer 42 at a lower elevation than a ground surface 40 which could represent a lower-permeability layer 42 beneath an aquifer 43 defined as a zone of saturation between a water table 41 and a lower-permeability layer (or aquitard) 42 wherein water at a higher elevation 44 than at a lower elevation 45 creates a flow regime from left to right in FIG. 36.

In the example application 700 shown in FIG. 36, a casing 21 serves the same purpose as a filter casing or filter channel described in detail in U.S. Pat. Nos. 9,937,537 B2 and 10,556,260 B2, in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either upward or downward flow direction according to its installation and site-specific arrangement.

An impervious barrier wall, although not shown in FIG. 36, is detachably secured to both sides of a casing 21 (perpendicular to the illustration) with a purpose of diverting groundwater to flow preferentially toward a casing 21. In the example application 700 shown in FIG. 36, groundwater flows laterally 48 into a higher elevation inlet screen 26 and moves generally downward through a casing 21 before discharging laterally 49 through a lower elevation outlet screen 27 (due to differences in hydraulic head resulting from the connection of a casing 21 to a barrier wall, not shown).

Specifically, in the example 700 shown in FIG. 36, groundwater laterally enters 48 a casing 21 through a higher elevation inlet screen 26 and flows laterally shown by parallel flow arrows 10 into a plurality of holes 304 of a hollow core packtivator sub 301 used to activate 340 a large packer assembly 100 near an upper elevation in a casing 21. Groundwater flows downward through the hollow core packtivator sub 301 as shown by parallel flow arrows 11.

A fluid treatment cartridge 80 and treatment media 89 (previously detailed in FIG. 25A and FIG. 25B) are shown below a large packer assembly 100 in FIG. 36. Groundwater flows downward and directly into a fluid treatment cartridge 80 as shown by parallel flow arrows 12 and continues downward into a treatment media 89 as shown by parallel flow arrows 13 for increased residence time and contact with a treatment media 89. Groundwater flows vertically downward exiting a plurality of holes 84 in a bottom of a cartridge 80 shown by parallel flow arrows 14 and laterally within a permeable spacer 30 shown by flow arrows 15 before discharging laterally 49 through a lower elevation outlet screen 27.

Figure 37:
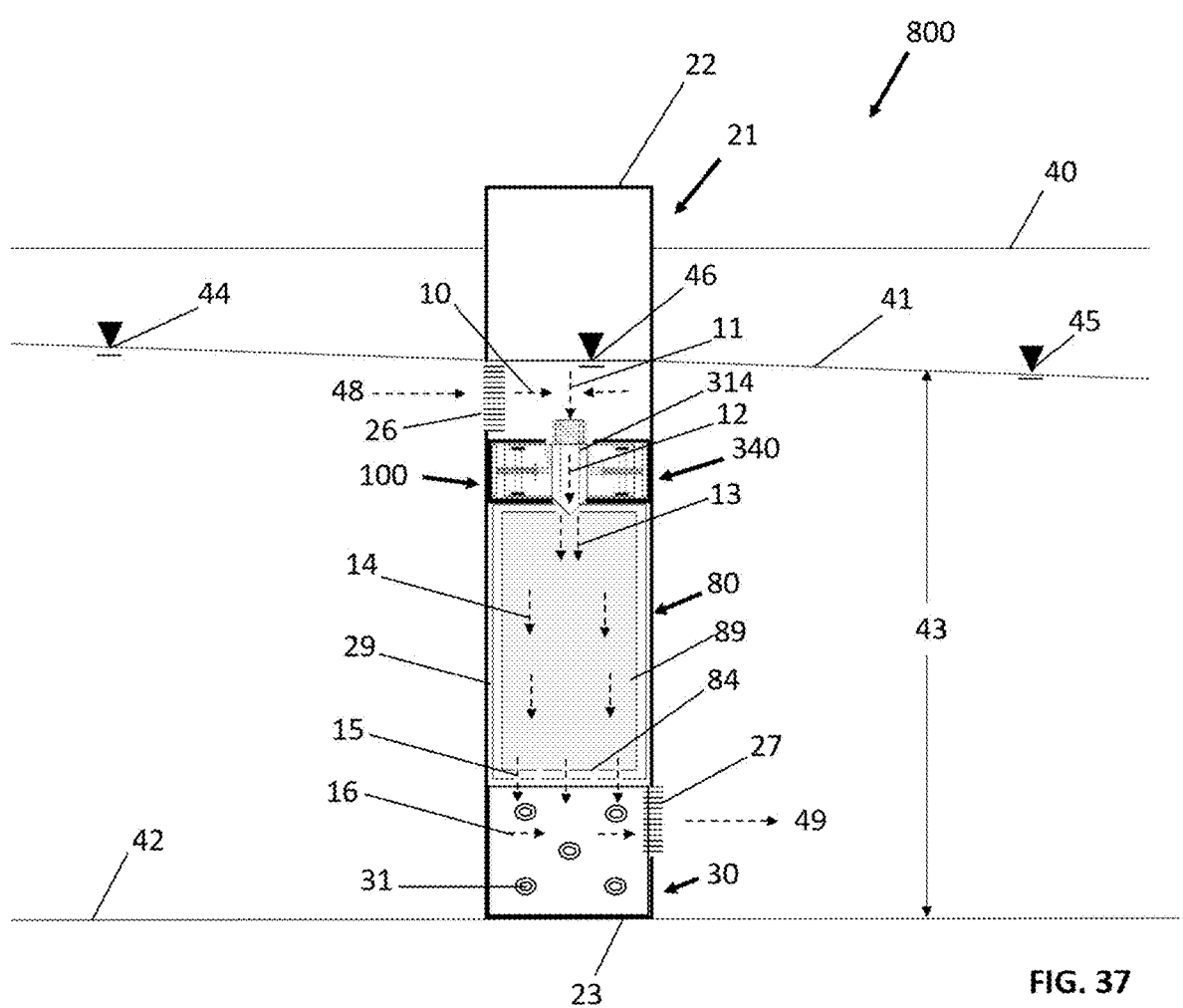
FIG. 37 is a side elevation view of an example application of a single activated mechanical packer system detailing the packer's control of downward fluid flow inside a casing in an example groundwater setting.

FIG. 37 is a side elevation view of an example application 800 of a mechanical packer system 100 in an activated state 340 detailing the control of an example packer system on a fluid in an example application 800. The fluid in application 800 could be groundwater, for example, although other fluids such as oil or gas could be envisioned. A cylindrical casing 21 with a top 22, bottom 23, a higher elevation well screen 26 on one side of a casing 21, and an lower elevation screen 27 on an opposing side of a casing 21 is shown installed below a ground surface 40 where an open bottom 23 is seated into a layer 42 at a lower elevation than a ground surface 40 which could represent a lower-permeability layer 42 beneath an aquifer 43 defined as a zone of saturation between a water table 41 and a lower-permeability layer (or aquitard) 42 wherein water at a higher elevation 44 than at a lower elevation 45 creates a flow regime from left to right in FIG. 37.

In the example application 800 shown in FIG. 37, a casing 21 serves the same purpose as a filter casing or filter channel described in detail in U.S. Pat. Nos. 9,937,537 B2 and 10,556,260 B2, in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either upward or downward flow direction according to its installation and site-specific arrangement.

An impervious barrier wall, although not shown in FIG. 37, is detachably secured to both sides of a casing 21 (perpendicular to the illustration) with a purpose of diverting groundwater to flow preferentially toward a casing 21. In the example application 800 shown in FIG. 37, groundwater flows 48 into a higher elevation inlet screen 26 and moves downward through a casing 21 before discharging 49 through a lower elevation outlet screen 27 (due to differences in hydraulic head resulting from the connection of a casing 21 to a barrier wall, not shown).

Specifically, in the example 800 shown in FIG. 37, groundwater laterally enters 48 a casing 21 through a higher elevation inlet screen 26 and flows laterally shown by flow arrows 10 and vertically downward shown by flow arrow 11 into a hollow core packtivator sub 314 used to activate 340 a large packer assembly 100 near an upper elevation in a casing 21. Groundwater flows vertically downward through the hollow core packtivator sub 314 as shown by flow arrow 12.

A fluid treatment cartridge 80 and treatment media 89 (previously detailed in FIG. 25A and FIG. 25B) are shown below a large packer assembly 100 in FIG. 37. Groundwater flows downward and directly into a fluid treatment cartridge 80 as shown by parallel flow arrows 13 and continues downward into treatment media 89 as shown by parallel flow arrows 14 for increased residence time and contact with a treatment media 89. Groundwater flows vertically downward exiting a plurality of holes 84 in a bottom of a cartridge 80 shown by parallel flow arrows 15 and laterally within an underlying permeable spacer 30 shown by flow arrows 16 before discharging laterally 49 through a lower elevation outlet screen 27.

Particular embodiments and features have been described with reference to the drawings. It is to be understood that these descriptions are not limited to any single embodiment or any particular set of features, and that similar embodiments and features may arise, or modifications and additions may be made without departing from the scope of these descriptions and the spirit of the appended claims.

What is claimed is:

1. A mechanical packer system comprising:
a packer assembly;
an actuator;
a positioning tool;
a plurality of disc assemblies, each comprising:
  a disc; and
  a cylindrical rod with a first end and a second end, the first end attached to the disc;
  the second end is beveled and
a casing;
wherein the packer assembly comprises:
  an upper plate including a plurality of first channels, a first central hole, and a plurality of first holes; and
  a lower plate including a plurality of second channels, a second central hole, and a plurality of second holes;
  wherein the upper plate and the lower plate are detachably securable to each other;
  wherein, when the upper plate and the lower plate are attached to each other:
    the plurality of first channels and the plurality of second channels are aligned to form a plurality of cylindrical bores and the first central hole and the second central hole are aligned; and
  each of the plurality of cylindrical bores house the cylindrical rod of a disc assembly, with each disc positioned on the outer circumference of the upper plate and the lower plate, and the second ends of each cylindrical rod extending into the first central hole and the second central hole;
wherein the actuator is operable to move the packer assembly from a non-active state to an active state; and
wherein the positioning tool is operable to engage the packer assembly to position the packer assembly into the casing.

2. The system of claim 1, further comprising a plurality of extension springs, wherein a first end of each extension spring of the plurality of extension springs is positioned in at least one hole of the plurality of second holes, wherein a second end of each extension spring is attached to the disc of one of the disc assemblies.

3. The system of claim 1, wherein the actuator further includes a beveled tip configured to contact a beveled end of at least one cylindrical rod of the plurality of cylindrical rods positioned in the aligned central hole of the upper plate and the lower plate.

4. The system of claim 1, wherein the central hole of the upper plate is tapered.

5. The system of claim 1, wherein each cylindrical bore includes at least one channel of the plurality of first channels positioned on a first side of the cylindrical bore and at least one other channel of the plurality of second channels positioned on an opposing side of the cylindrical bore from the at least one channel of the plurality of first channels.

6. The system of claim 1 further comprising a formed rubber material, where the formed rubber material exteriorly envelops the upper plate, the lower plate, and the disc assembly.

7. The system of claim 1, wherein each disc assembly further comprises at least two extension springs, each extension spring with a flat end and a circular end.

8. The system of claim 7, wherein the first end of each cylindrical rod is a flat end, wherein the flat end of the cylindrical rod is attached to a concave side of the disc, wherein the flat end of first extension spring of the at least two extension springs is attached to a first location on the concave side of the disc, wherein the flat end of a second extension spring of the at least two extension springs is secured a second location on the concave side of the disc, wherein the second extension spring is attached to a location opposite the first extension spring relative to the cylindrical rod.

9. The system of claim 1, wherein each disc assembly is detachably securable to the lower plate, wherein each disc assembly is positioned on a top of the lower plate.

10. The system of claim 1, wherein the central hole of the upper plate includes a plurality of tapered threads, wherein the positioning tool includes a plurality of tapered threads, wherein the plurality of tapered threads of the positioning tool is operable to attach to the plurality of tapered threads of the central hole of the upper plate.

11. The system of claim 1, wherein the actuator includes a beveled tip configured to contact an opposing beveled end of at least two cylindrical rods of the plurality of cylindrical rods positioned in the central hole of the lower plate and the central hole of the upper plate, wherein the actuator is operable to extend the at least two cylindrical rods radially outward from the center of the upper plate and the lower plate.

12. The system of claim 11, wherein the actuator is further configured to extend the at least two rods at a predetermined position in a casing.

13. The system of claim 1, wherein the packer assembly is a first packer assembly, wherein the system further comprises a second packer assembly and a fluid-treatment cartridge, wherein the fluid-treatment cartridge includes a plurality of sidewalls, a top, a bottom, a plurality of holes, an open cylindrical tube, a cylinder, a hole in the top, and a hole in the bottom, wherein, when the first packer assembly is positioned within the casing the fluid-treatment cartridge is configured to be positioned on the top of the upper plate of the first packer assembly, and the second packer assembly is configured to be in contact with the cylinder of the fluid-treatment cartridge.

14. The system of claim 13, wherein the positioning tool is further configured to extend the packer assembly to a predetermined position in a casing.

15. The system of claim 1, further comprising a fluid-treatment cartridge positioned on top of the packer assembly, the fluid-treatment cartridge comprising:
an external cylinder including a plurality of external walls,
an internal cylinder including a plurality of walls, wherein the plurality of walls of the internal cylinder include a plurality of holes,
a circular bottom including a hole, wherein the circular bottom is detachably secured to the internal cylinder and the external cylinder,
an annular space between an inner wall of the external cylinder and an outer wall of the internal cylinder, wherein the annular space includes treatment media, and
a circular top including a plurality of holes, wherein the circular top is detachably secured to the external cylinder.

16. A mechanical packer system comprising:
a packer assembly comprising
  an upper plate comprising a plurality of first channels, a plurality of second channels, and a central tapered hole; and
  a lower plate comprising a plurality of third channels, a plurality of fourth channels, and a central hole;

a cylindrical actuator;

a positioning tool; and a plurality of disc assemblies, wherein each disc assembly of the plurality of disc assemblies comprises a disc, a cylindrical rod with a flat end and a beveled end, and at least two extension springs, wherein each extension spring includes a flat end and a circular end, wherein the upper plate and the lower plate are detachably secured;

wherein the cylindrical actuator is operable to actuate the packer assembly;

wherein, when the upper plate and the lower plate are detachably secured, the plurality of first channels is aligned with the plurality of third channels to form a plurality of first cylindrical bores, wherein the plurality of second channels is aligned with the plurality of fourth channels to form a plurality of second cylindrical bores, wherein the central hole of the lower plate is aligned with the central hole of the upper plate;

wherein at least one disc assembly of the plurality of disc assemblies is positioned on top of the lower plate, wherein the cylindrical rod of the at least one disc assembly of the plurality of disc assemblies is positioned within a cylindrical bore of the plurality of first cylindrical bores, wherein a first extension spring of the at least two extension springs is positioned in one of the second cylindrical bores on a first side of the first cylindrical bore with the cylindrical rod is positioned within, and wherein the other extension spring of the at least two extension springs is positioned in another of the second cylindrical bores positioned on an opposing side of the first cylindrical bore with the cylindrical rod is positioned within relative to the first extension spring.

17. The system of claim 16, wherein the plurality of disc assemblies includes a first disc assembly and a second disc assembly, wherein the first disc assembly is the at least one disc assembly positioned on top of the lower plate, wherein the second disc assembly is configured for detachable securement and is positioned at an opposing side of the lower plate relative to the first disc assembly.

18. The system of claim 17, further comprising a formed rubber material, wherein the formed rubber material exteriorly envelops the upper plate, the lower plate, and the plurality of disc assemblies.

19. The system of claim 16, wherein the positioning tool includes a plurality of tapered threads, wherein the plurality of tapered threads is operable to attach to the threads of the central hole of the upper plate.

20. The system of claim 16, wherein the cylindrical actuator is operable to move the packer assembly from a non-active state to an active state, wherein, when moving from in the non-active state to the active state, the cylindrical actuator is configured to radially extend the plurality of disc assemblies.

* * * * *